US008005037B2

(12) United States Patent
Ishii et al.

(10) Patent No.: US 8,005,037 B2
(45) Date of Patent: Aug. 23, 2011

(54) COMMUNICATION CONTROL METHOD, RADIO BASE STATION, AND RADIO CONTROL STATION

(75) Inventors: Hiroyuki Ishii, Yokosuka (JP); Takahiro Hayashi, Yokosuka (JP); Akihito Hanaki, Yokohama (JP); Junichiro Kawamoto, Yokohama (JP); Yoshikazu Goto, Yokosuka (JP); Koji Furutani, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 604 days.

(21) Appl. No.: 11/863,859

(22) Filed: Sep. 28, 2007

(65) Prior Publication Data
US 2008/0081637 A1    Apr. 3, 2008

(30) Foreign Application Priority Data
Sep. 29, 2006 (JP) ................. P2006-268213

(51) Int. Cl.
*H04W 4/00* (2009.01)
(52) U.S. Cl. .......... 370/328; 370/235; 455/450
(58) Field of Classification Search .......... 370/328–329, 370/335–336, 338, 437, 441–444, 230, 230.1, 370/231–235, 237; 455/450–451, 452.1–452.2
See application file for complete search history.

(56) References Cited

U.S. PATENT DOCUMENTS

| | | | | |
|---|---|---|---|---|
| 6,711,126 B1 * | 3/2004 | Besset-Bathias | ............ | 370/229 |
| 6,965,772 B1 * | 11/2005 | Mohebbi et al. | ............ | 455/442 |
| 7,505,755 B2 * | 3/2009 | Taniguchi et al. | ........... | 455/405 |
| 7,724,701 B2 * | 5/2010 | Lundby et al. | ................ | 370/328 |
| 7,764,680 B2 * | 7/2010 | Matsumoto et al. | ......... | 370/389 |
| 2002/0077113 A1 * | 6/2002 | Spaling et al. | ................ | 455/453 |
| 2003/0083069 A1 * | 5/2003 | Vadgama | ..................... | 455/436 |
| 2004/0052212 A1 * | 3/2004 | Baillargeon | .................. | 370/235 |
| 2004/0072565 A1 * | 4/2004 | Nobukiyo et al. | ............ | 455/436 |
| 2004/0090931 A1 * | 5/2004 | Proctor et al. | ................ | 370/328 |
| 2004/0264377 A1 * | 12/2004 | Kilkki et al. | .................. | 370/235 |
| 2005/0124369 A1 | 6/2005 | Attar et al. | | |

(Continued)

FOREIGN PATENT DOCUMENTS
JP    1-238328    9/1989
(Continued)

OTHER PUBLICATIONS

Office Action issued Feb. 15, 2011, in Japanese Patent Application No. 2006-268213 (with English-language Translation).

(Continued)

*Primary Examiner* — Chi H. Pham
*Assistant Examiner* — Kevin Mew
(74) *Attorney, Agent, or Firm* — Oblon, Spivak, McClelland, Maier & Neustadt, L.L.P.

(57) ABSTRACT

A communication control method for a mobile communication system having a plurality of mobile stations, a radio base station, and a radio control station comprises a measurement step, an evaluation step, and a control step. In the measurement step, a plurality of congestion parameters related to factors generating congestion is measured in a mobile communication system. In the evaluation step, the radio control station evaluates a congestion degree corresponding to each of the plurality of congestion parameters. In the control step, a communication setting between the radio base station and at least one of the plurality of mobile stations is controlled in accordance with a control instruction transmitted from the radio control station to the radio base station when at least one of the plurality of congestion degrees is a prescribed level or more.

13 Claims, 18 Drawing Sheets

U.S. PATENT DOCUMENTS

| | | |
|---|---|---|
| 2006/0030345 A1 | 2/2006 | Jain et al. |
| 2006/0126507 A1* | 6/2006 | Nakayasu ................. 370/229 |
| 2007/0036079 A1* | 2/2007 | Chowdury et al. ........... 370/235 |
| 2008/0056125 A1* | 3/2008 | Kneckt et al. ................ 370/229 |
| 2008/0076442 A1* | 3/2008 | Ishii et al. .................... 455/453 |

FOREIGN PATENT DOCUMENTS

| | | |
|---|---|---|
| JP | 2001-144856 | 5/2001 |
| JP | 2001-309036 | 11/2001 |
| JP | 3333471 | 7/2002 |
| JP | 2003-009221 | 1/2003 |
| JP | 2005-525743 | 8/2005 |
| JP | 2006-203305 | 8/2006 |
| JP | 2008-527908 | 7/2008 |
| WO | WO 03/096571 A1 | 11/2003 |
| WO | WO 2006/075951 A1 | 7/2006 |

OTHER PUBLICATIONS

Japanese Office Action with English translation dated May 17, 2011 in Japanese Patent Application No. 2006-268213 filed Sep. 29, 2006, 6 pages.

* cited by examiner

Fig.9

|  | DOWNLINK CODE USAGE |
|---|---|
| CONGESTION LEVEL A | 70%~100% |
| CONGESTION LEVEL B | 30%~70% |
| CONGESTION LEVEL C | 0%~30% |

*Fig.10*

|  | DOWNLINK BASEBAND RESOURCE USAGE |
|---|---|
| CONGESTION LEVEL A | 70%~100% |
| CONGESTION LEVEL B | 30%~70% |
| CONGESTION LEVEL C | 0%~30% |

*Fig.11*

|  | DOWNLINK TRANSMISSION POWER |
|---|---|
| CONGESTION LEVEL A | 41dBm OR MORE |
| CONGESTION LEVEL B | 39 dBm OR MORE LESS THAN 41 dBm |
| CONGESTION LEVEL C | LESS THAN 39dBm |

*Fig.12*

|  | DOWNLINK BASEBAND RESOURCE USAGE RAISING-THRESHOLD | DOWNLINK BASEBAND RESOURCE USAGE LOWERING-THRESHOLD |
|---|---|---|
| CONGESTION LEVEL A | 80% | 70% |
| CONGESTION LEVEL B | 40% | 30% |
| CONGESTION LEVEL C | — | — |

COMMUNICATION CONTROL METHOD, RADIO BASE STATION, AND RADIO CONTROL STATION

BACKGROUND OF THE INVENTION

1. Field of the Invention

The present invention relates to a communication control method, a radio base station, and a radio control station, and more particularly to a communication control method, a radio base station, and a radio control station for a mobile communication system comprising a radio control station for controlling communications between a radio base station and a plurality of mobile stations.

2. Related Background of the Invention

A mobile communication system is a system, which carries out communications using limited resources (frequencies and power), and has an upper limit to communication capacity. Therefore, a variety of factors, such as an increase in the number of users (number of mobile stations) carrying out communications in a mobile communication system, give rise to communications congestion, by which the quality of communications already being carried out deteriorates, or new communications cannot be commenced. A situation like this is generally called congestion.

As a method for avoiding congestion, a method in which a radio control station receives a plurality of parameters impacting the management of a radio channel from a radio base station, and adjusts the utilization of radio resources, is known (See Japanese Patent Application Laid-open (National Publication of Translated Version) No. 2005-525743).

Further, when a channel is saturated, a method for controlling the transmission rate and channel connection between a mobile station and the radio base station on the basis of a priority allocated to the mobile station is known (See Japanese Patent No. 3333471). In addition, a method for establishing a radio channel to a mobile station inside the radio zone of a mobile destination based on the priority of the mobile station at handover is known (See Japanese Patent Application Laid-open No. Hei. 01-238328).

SUMMARY OF THE INVENTION

In the method disclosed in Japanese Patent Application Laid-open (National Publication of Translated Version) No. 2005-525743, the radio base station measures a plurality of parameters, which impact on the management of a radio channel, and send these parameters to the radio control station to adjust the utilization of radio resources. However, for example, the radio control station does nothing more than carry out various types of control corresponding to a single parameter, like executing power control upon receiving a power-related parameter. For this reason, the radio control station is not able to accurately estimate the congestion generated by the combination of a plurality of factors, and cannot exercise control for avoiding congestion.

Also, in the method disclosed in Japanese Patent No. 3333471, since channel saturation is determined based solely on the number of users engaged in communications, it is not possible to exercise accurate control for avoiding the congestion resulting from factors other than an increase in the number of users. In addition, in the method disclosed in Japanese Patent Application Laid-open No. Hei. 01-238328, since control is carried out based solely on whether or not a radio channel is free, it is not possible to carry out accurate control for avoiding the congestion caused by factors other than the presence or absence of a free radio channel.

Accordingly, an object of the present invention is to provide a communication control method, radio base station and radio control station, which are capable of avoiding the generation of congestion by accurately estimating the congestion of a mobile communication system.

The communication control method of the present invention is a communication control method for a mobile communication system, which comprises a plurality of mobile stations, a radio base station capable of communicating with the plurality of mobile stations, and a radio control station, which is able to communicate with the radio base station and which controls communications between the radio base station and the plurality of mobile stations, the communication control method comprising: a measurement step of measuring a plurality of congestion parameters related to factors generating congestion in the mobile communication system; an evaluation step of evaluating, by the radio control station, a congestion degrees corresponding to each of the plurality of congestion parameters measured in the measurement step; and a control step of controlling a communication setting between the radio base station and at least one of the plurality of mobile stations in accordance with a control instruction transmitted from the radio control station to the radio base station when at least one of the plurality of congestion degrees acquired by the evaluation step is a prescribed level or more.

According to this communication control method, the congestion degrees for each of a plurality of congestion parameters related to factors generating congestion are evaluated, and the communication setting between the radio base station and the mobile station is controlled. Therefore, since the state of congestion of the mobile communication system is accurately estimated by taking into account a plurality of factors generating congestion, it is possible to precisely avoid the generation of congestion.

In the evaluation step of the above-mentioned communication control method, when the radio control station changes a congestion level depicting the congestion degree corresponding to any of the plurality of congestion parameters after storing the congestion level in the evaluation step, a first threshold for raising the congestion level may be higher than a second threshold for lowering the congestion level. By so doing, the frequency with which the congestion degree is changed in response to the fluctuation of the congestion parameters in a short period of time is reduced. Therefore, since the frequency with which the communication setting between the mobile station and the radio base station is controlled by control instructions from the radio control station can be held in check, it is possible to reduce excessive loads placed on the respective components of the mobile communication system.

Further, in the above-mentioned communication control method, the congestion degree may be divided into no less than three congestion levels, and a higher congestion degree is set in a higher congestion level than in a lower congestion level. Constituting the congestion degree like this enables flexible, and fine-tuned control.

In addition, in the above-mentioned communication control method, at least one of the plurality of congestion parameters may be a parameter related to downlinks between the radio base station and the plurality of mobile stations. Also, at least one of the plurality of congestion parameters may be either code usage, baseband resource usage or transmission power. Treating these parameters as congestion parameters enables fine-tuned control.

Further, the above-mentioned communication control method may further comprise a priority determination step of determining a priority, which has been set for the plurality of mobile stations by the radio control station, wherein the control instruction in the control step is an instruction for controlling the communication setting in accordance with the congestion degree and the priority. By using a communication control method like this, the communication setting between the radio base station and the mobile station is controlled on the basis of the priority established for the mobile station in addition to the plurality of congestion parameters. Therefore, in a state of communication congestion in which congestion is likely to occur, it is possible to carry out precise communication control that conforms to the mobile station user, while avoiding the generation of congestion.

Further, the control instruction in the control step may be an instruction related to the communication setting between the radio base station and the mobile station which has the low priority and which has been communicating for a long time. Using a control instruction like this, for example, makes it possible to restrict usage by the mobile station, which has been in use for a long time, and to more precisely carry out communication control that conforms to the mobile station user.

In addition, the communication setting controlled by the control instruction in the control step may be a setting related to changes in a transmission rate. Further, the communication setting controlled by the control instruction in the control step may be a setting related to changes in a communication channel. Using a communication setting like this makes it possible to more precisely carry out communication control in accordance with the congestion degree.

The communication setting controlled by the control instruction in the control step may be a setting for rejecting a communication from a mobile station, which is attempting to start a new communication. In a state of congestion in which the congestion degree exceeds a prescribed level, using a communication setting like this makes it possible to protect the quality of communications between the radio base station and the mobile stations, which are already engaged in communications in a cell, by rejecting a communication generated inside the cell to which the radio base station is capable of providing communications to mobile stations.

The present invention can be disclosed as an invention related to a communication control method as above, and can also be disclosed as an invention related to a radio base station and a radio control station as follows.

A radio base station of the present invention is a radio base station in a mobile communication system, which comprises a plurality of mobile stations, a radio base station capable of communicating with the plurality of mobile stations, and a radio control station, which is able to communicate with the radio base station, and which controls communications between the radio base station and the plurality of mobile stations, the radio base station comprising: a parameter acquisition portion for acquiring a plurality of congestion parameters related to factors generating congestion in the mobile communication system; a transmission portion for transmitting the plurality of congestion parameters acquired by the parameter acquisition portion to the radio control station; a reception portion for receiving from the radio control station a control instruction for controlling a communication setting between the radio base station and the plurality of mobile stations; and a control portion for controlling the communication setting between the radio base station and at least one of the plurality of mobile stations, based on the control instruction received by the reception portion, wherein the parameter acquisition portion acquires data related to baseband resource usage as one of the plurality of congestion parameters.

This radio base station acquires a plurality of congestion parameters, which comprise data related to baseband resource usage as one of the plurality of congestion parameters. Therefore, since a control instruction, which takes into account baseband resource usage as a factor generating congestion, can be received from the radio control station, it is possible to more precisely control the communication setting between the radio base station and the mobile station.

A radio control station of the present invention is a radio control station in a mobile communication system, which comprises a plurality of mobile stations, a radio base station capable of communicating with the plurality of mobile stations, and the radio control station, which is able to communicate with the radio base station, and which controls communications between the radio base station and the plurality of mobile stations, the radio control station comprising: a reception portion for receiving a plurality of congestion parameters related to factors generating congestion in the mobile communication system; an evaluation portion for evaluating congestion degrees corresponding to the plurality of congestion parameters acquired by the reception portion; an instruction generating portion for generating a control instruction for controlling a communication setting between the radio base station and at least one of the plurality of mobile stations, when at least one of the plurality of congestion degrees acquired by the evaluation portion is a prescribed level or more; and a transmission portion for transmitting the control instruction generated by the instruction generating portion to either the radio base station or at least one of the plurality of mobile stations.

According to this radio control station, the congestion degrees for each of the plurality of congestion parameters related to factors generating congestion are evaluated, and a control instruction for controlling the communication setting between the radio base station and the mobile station is generated. Therefore, since the state of congestion of the mobile communication system can be estimated more accurately by taking into account a plurality of factors generating congestion, the radio control station is able to transmit to the radio base station a control instruction for precisely avoiding the generation of congestion.

As mentioned above, according to the present invention, the state of congestion of the mobile communication system is accurately estimated by evaluating the congestion degrees of each of a plurality of congestion parameters related to factors generating congestion. Therefore, since the state of congestion of the mobile communication system is estimated by taking into account a plurality of factors, the generation of congestion can be precisely avoided.

BRIEF DESCRIPTION OF THE DRAWINGS

FIG. 9 is a diagram showing a table for evaluating the congestion degree related to code usage in a downlink.

FIG. 10 is a diagram showing a table for evaluating the congestion degree related to baseband resource usage in a downlink.

FIG. 11 is a diagram showing a table for evaluating the congestion degree related to transmission power in a downlink.

FIG. 12 is a diagram showing a table for evaluating the congestion degree related to baseband resource usage in a downlink when a raising-threshold and a lowering-threshold are set.

DESCRIPTION OF THE PREFERRED EMBODIMENTS

The embodiments of a communication control method, radio base station, and radio control station related to the present invention will be explained below while referring to the figures.

First, a mobile communication system, in which a communication control method related to an embodiment of the present invention is applied, will be explained.

Figure 1:
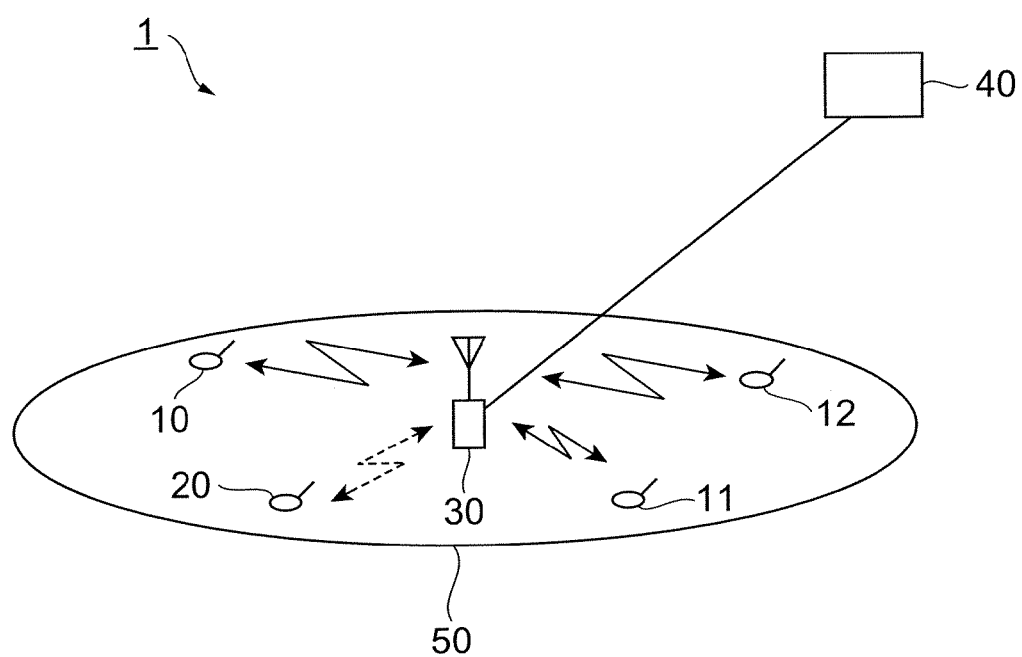
FIG. 1 is a conceptual diagram showing an example of the constitution of a mobile communication system in which a communication control method related to an embodiment of the present invention is applied.

As shown in the system configuration diagram of FIG. 1, a mobile communication system 1 related to this embodiment comprises a plurality of mobile stations 10, 11, 12, 20; a radio base station 30; and a radio control station 40, which controls the mobile stations 10, 11, 12, 20 and the radio base station 30. The radio base station 30 is able to communicate with the plurality of mobile stations 10, 11, 12, 20. Further, the radio control station 40 is able to communicate with the radio base station 30, and also controls communications between the radio base station 30 and the plurality of mobile stations 10, 11, 12, 20. Furthermore, the radio base station 30 and the radio control station 40, which constitute the mobile communication system 1, are also the radio base station and radio control station related to the embodiments of the present invention.

A cell 50 shows the area in which the radio base station 30 is able to provide communications to the mobile stations 10, 11, 12, 20. FIG. 1 shows a state in which the mobile stations 10, 11, 12 are already communicating with the radio base station 30 in the cell 50, and the mobile station 20 is attempting to start a new communication with the radio base station 30 in the cell 50.

Since the mobile stations 10, 11, 12, 20, which carry out communications with the radio base station 30, comprise the same constitutions and functions, unless otherwise specified, hereinafter the explanation will use the mobile station 10 as an example of a mobile station carrying out communications with the radio base station 30. Further, the explanation will use the mobile station 20 as an example of a mobile station attempting to start a new communication.

Mobile communication systems comprising a constitution like this include the so-called third-generation mobile communication system, and standardized specifications for a mobile communication system called the IMT-2000 stipulate specifications related to a W-CDMA mode and a cdma-2000 mode for local standardization agency-organized 3GPP/3GPP2 (Third-Generation Partnership Project/Third-Generation Partnership Project 2), respectively.

For example, in the W-CDMA Release 99 system, a one-to-one communication channel called a dedicated channel is established between a radio base station and a mobile station, and communications are carried out via this dedicated channel.

In a mobile communication system like this, limited resources, for example, include the downlink transmission power of the radio base station, channelization code usage (hereinafter, code usage), and baseband resource usage. Here, baseband resource usage signifies the usage of hardware resources related to processing carried out inside a radio base station, such as physical memory capacity, and CPU processing capabilities.

Also, in a mobile communication system like this, it is possible to determine the state of communication congestion based on these usages and power. For example, to determine the state of communication congestion based on the transmission power when the maximum transmission power (upper limit) of the radio base station is 20 W, it is possible to determine that communications are becoming congested in the area to which this radio base station is providing communications when the transmission power of the radio base station approaches 20 W. Also, because the code usage and baseband usage have the same upper limits, it is also possible to determine that this area is congested when these usage levels approach their respective upper limits.

Next, the elements constituting the mobile communication system 1, and the functions thereof will be explained while referring to FIGS. 2 through 8.

First, the elements constituting the mobile station 10 and the functions thereof will be explained. Furthermore, as mentioned above, since the mobile stations 10, 11, 12, 20 comprise the same constitutions and functions, the mobile station 10 will be explained, and duplicate explanations will be omitted.

Figure 2:
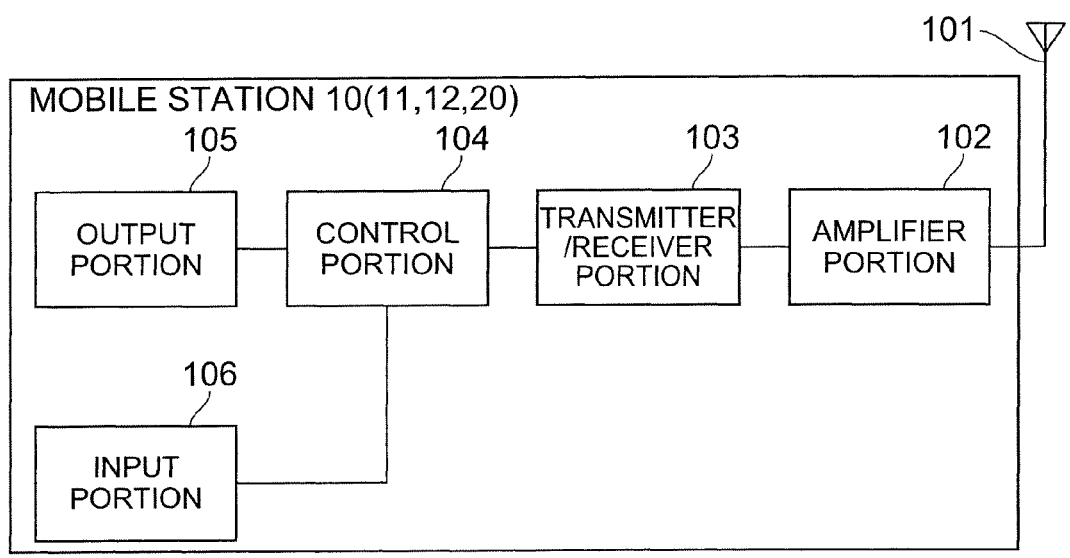
FIG. 2 is a functional block diagram of a mobile station constituting the mobile communication system.

FIG. 2 is a block diagram showing the functional constitution of the mobile station 10. The mobile station 10, as shown in FIG. 2, functionally comprises a transmitting/receiving antenna 101, an amplifier portion 102, a transmitter/receiver portion 103, a control portion 104, an output portion 105 and an input portion 106.

Figure 3:
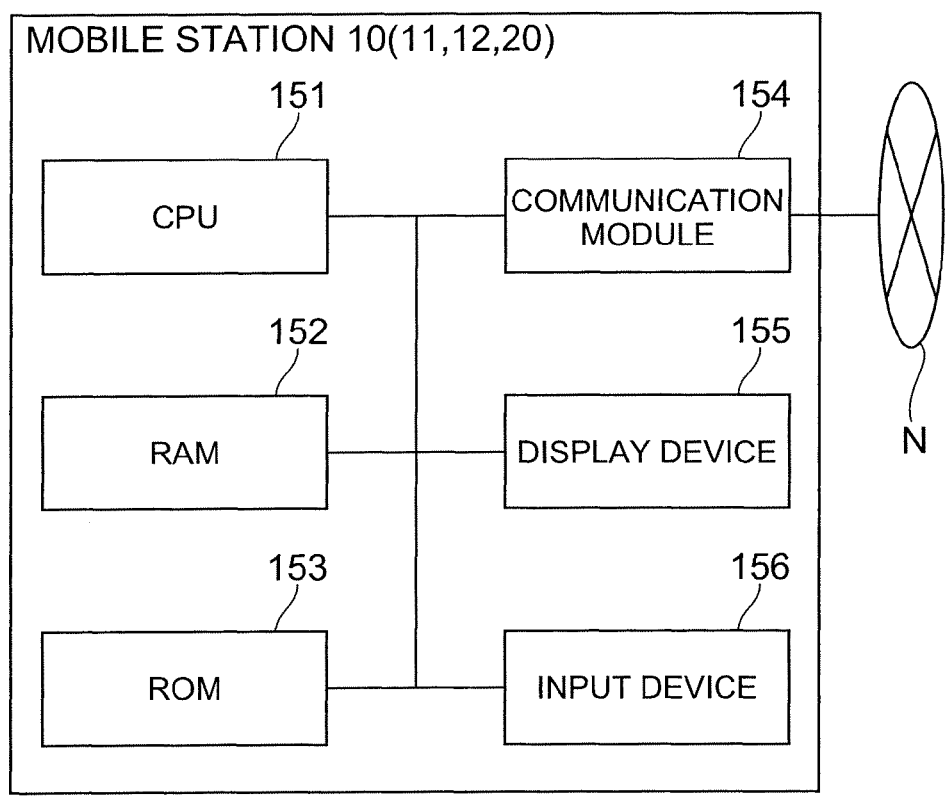
FIG. 3 is a diagram showing the hardware configuration for a mobile station constituting the mobile communication system.

FIG. 3 is a diagram showing an example of the hardware configuration of the mobile station 10. The mobile station 10, as shown in FIG. 3, is physically constituted as a communication terminal comprising a CPU 151, a RAM 152 and a ROM 153, which are storage devices, a communication module 154, which is a transmitting/receiving device for carrying out communications via a communication network N, a display device 155 such as a liquid crystal display, and an input device 156 such as a ten-key pad and arrow keys. The respective functions explained in FIG. 2 are realized by reading prescribed computer software into the CPU 151, RAM 152 and other hardware shown in FIG. 3, and operating the communication module 154, display device 155 and input device 156 under the CPU 151 control to carry out data read/write from/to the RAM 152 and ROM 153.

The respective functional elements of the mobile station 10 will be explained below using FIG. 2.

The transmitting/receiving antenna 101 is the part that carries out transmitting/receiving of data with the radio base station 30, and a radio frequency signal received from the radio base station 30 is outputted to the amplifier portion 102. The amplifier portion 102, after amplifying the inputted signal, outputs this amplified signal to the transmitter/receiver portion 103, and the transmitter/receiver portion 103, after performing the necessary frequency conversion processing for the amplified signal, outputs this signal to the control portion 104. The control portion 104 carries out processing in accordance with the signal inputted from the transmitter/receiver portion 103, and outputs voice, graphics and other data via the output portion 105. Further, a control instruction for changing the communication setting between the mobile station 10 and the radio base station 30 is received by the transmitting/receiving antenna 101 by way of the radio base station 30 after being sent from the radio control station 40, and the same as when there is voice, graphics and other such data, is processed by the amplifier portion 102, the transmitter/receiver portion 103 and the control portion 104. Consequently, the communication setting between the mobile station 10 and the radio base station 30 is controlled by the control instruction from the radio control station 40. Furthermore, details concerning this control instruction will be explained hereinbelow. Conversely, the input portion 106 outputs the voice, graphics and other such data inputted by the mobile station user to the control portion 104, and the control portion 104 outputs a signal obtained by carrying out processing in accordance with the data inputted from the input portion 106 to the transmitter/receiver portion 103. The transmitter/receiver portion 103, after carrying out the needed frequency conversion processing for the signal inputted to the transmitter/receiver portion 103, outputs this signal to the amplifier portion 102. After amplifying the signal received from the transmitter/receiver portion 103, the amplifier portion 102 sends the amplified signal to the radio base station 30 by way of the transmitting/receiving antenna 101.

Next, the elements constituting the radio base station 30 and the functions thereof will be explained.

Figure 4:
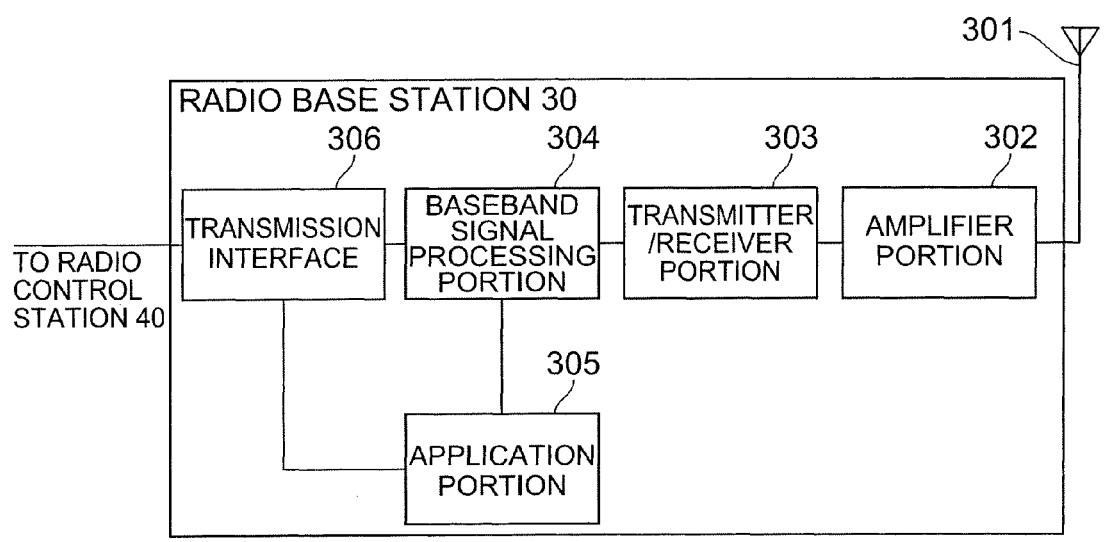
FIG. 4 is a functional block diagram of a radio base station constituting the mobile communication system.
Figure 5:
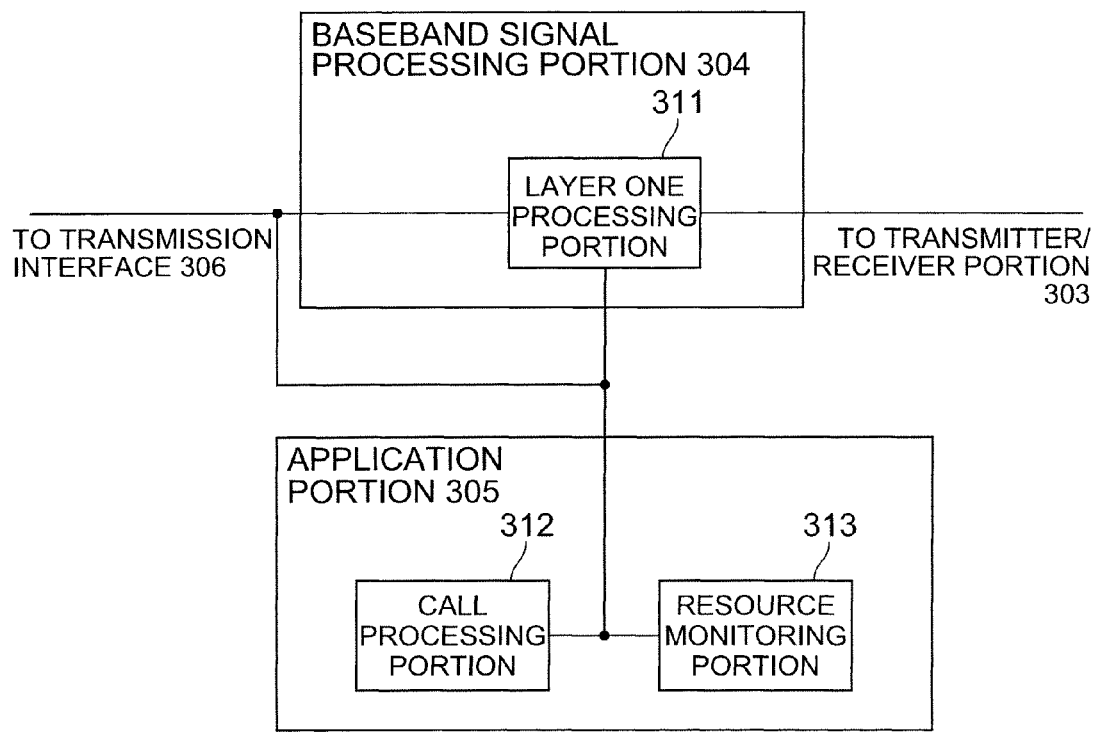
FIG. 5 is a functional block diagram of a baseband signal processing portion and application portion constituting the radio base station.

FIGS. 4 and 5 are block diagrams showing the functional constitution of the radio base station 30. The radio base station 30, as shown in FIG. 4, functionally comprises a transmitting/receiving antenna 301, an amplifier portion 302, a transmitter/receiver portion 303, a baseband signal processing portion 304 (parameter acquisition means), an application portion 305 (control means), and a transmission interface 306 (transmission means, reception means). Further, as shown in FIG. 5, the baseband signal processing portion 304 comprises a layer one processing portion 311, and the application portion 305 comprises a call processing portion 312 and a resource monitoring portion 313. The layer one processing portion 311 (parameter acquisition means) of the baseband signal processing portion 304 is connected to the call processing portion 312 (control means) and the resource monitoring portion 313 of the application portion 305.

Figure 6:
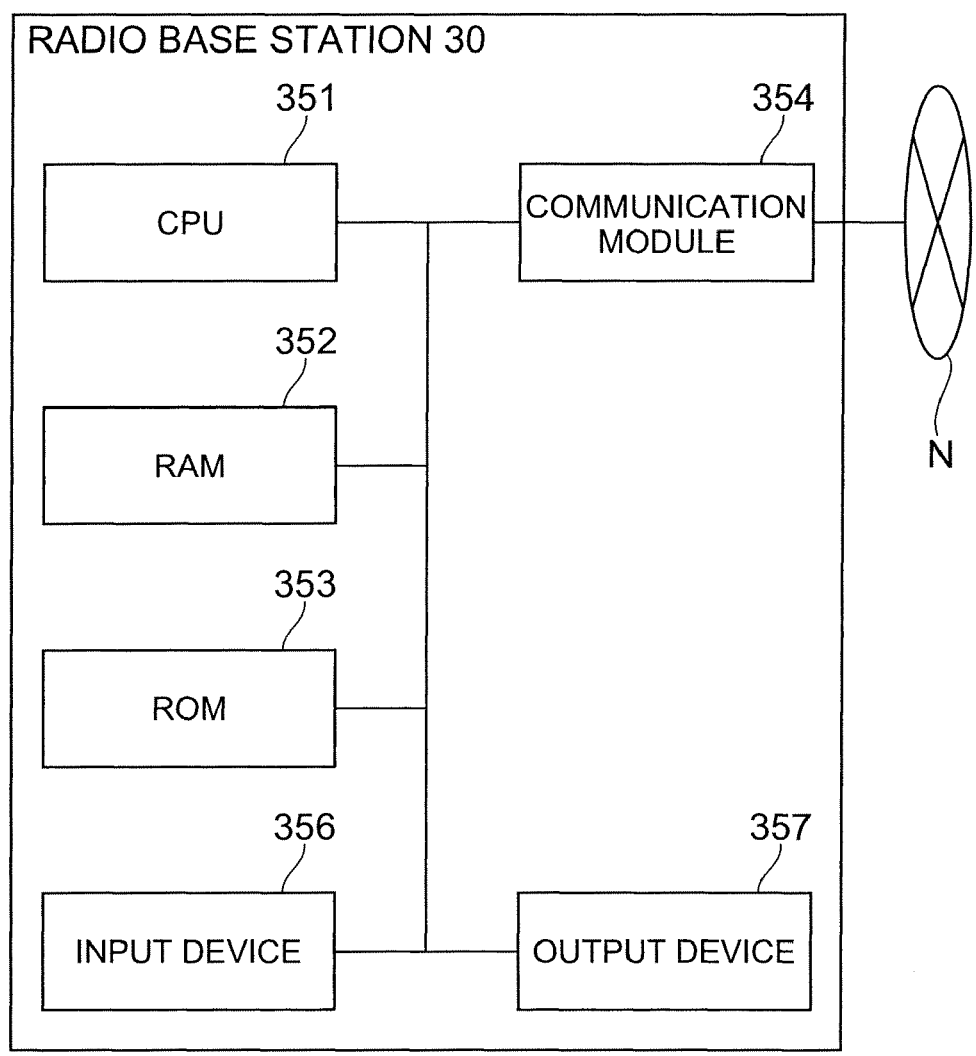
FIG. 6 is a diagram showing the hardware configuration for the radio base station constituting the mobile communication system.

FIG. 6 is a diagram showing an example of the hardware configuration of the radio base station 30. The radio base station 30, as shown in FIG. 6, is physically constituted as a communication device comprising a CPU 351, a RAM 352 and a ROM 353, which are storage devices, a communication module 354, which is a transmitter/receiver device for carrying out communications over a communications network N, and an input device 356 and an output device 357 for carrying out input/output related to the processing of the CPU 351. The respective functions explained in FIGS. 4 and 5 are realized by reading prescribed computer software into the CPU 351, the RAM 352 and other hardware shown in FIG. 6, and operating the communication module 354 and so forth under the CPU 351 control to carry out data read/write from/to the RAM 352 and the ROM 353.

The respective functional elements of the radio base station 30 will be explained below by using FIGS. 4 and 5.

Transmission data, so-called downlink data, from the radio control station 40, which is positioned superordinate to the radio base station 30 in the mobile communication system 1, is inputted to the baseband signal processing portion 304 via the transmission interface 306 from the radio control station 40 to the radio base station 30. The baseband signal processing portion 304 carries out channel coding and spreading processing, and outputs the post-processed baseband signal to the transmitter/receiver portion 303. The transmitter/receiver portion 303 subjects the baseband signal outputted from the baseband signal processing portion 304 to frequency conversion processing, which converts the baseband signal to a radio frequency band, and outputs this radio frequency band to the amplifier portion 302. After amplifying the frequency-converted signal, the amplifier portion 302 sends the amplified signal to the mobile stations 10, 11, 12, 20 inside the cell 50 via the transmitting/receiving antenna 301.

Conversely, transmission data, so-called uplink data, to the radio control station 40 is inputted to the amplifier portion 302 as a radio frequency signal by way of the transmitting/receiving antenna 301. The amplifier portion 302 amplifies the inputted radio frequency signal, and thereafter, outputs the amplified signal to the transmitter/receiver portion 303. Then, the transmitter/receiver portion 303 converts the amplified signal to a baseband signal by subjecting it to frequency conversion, and outputs the baseband signal to the baseband signal processing portion 304. The baseband signal processing portion 304, after subjecting the inputted baseband signal to despreading, RAKE combining, and error correction and decoding processing, transmits the post-processed signal to the radio control station 40 by way of the transmission interface 306.

The layer one processing portion 311 shown in FIG. 5 carries out downlink data channel coding, uplink data channel decoding, and transmission power control, RAKE combining, and spreading/despreading processing for the dedicated uplink and downlink channels. This layer one processing portion 311 measures the baseband resource usage in the downlink, and the baseband resource usage in the uplink, which are congestion parameters, and notifies these measurements to the resource monitoring portion 313. Baseband resource usage here, as mentioned above, signifies, for example, the use of hardware resources, such as physical memory capacity and CPU processing capabilities.

Furthermore, the layer one processing portion 311 measures the downlink transmission power, which is a congestion parameter, and notifies this measurement to the resource monitoring portion 313. Here, transmission power refers to the total transmission power of the radio base station 30. That is, it is the sum of the transmission power of all the channels over which the radio base station 30 is transmitting.

Furthermore, the explanation given here is of a situation in which downlink transmission power is measured by the baseband signal processing portion 304, but transmission power measurements can also be carried out by other functional portions, for example, the amplifier portion 302 or the transmitter/receiver portion 303.

Also, the processing by the layer one processing portion 311 is carried out based on the communication setting between the radio base station 30 and the mobile station 10. This communication setting is set in the call processing portion 312, and is controlled by a control instruction sent to the radio base station 30 from the radio control station 40.

The call processing portion 312 transmits and receives call processing control signals to and from the radio control station 40, and carries out radio base station 30 status management and resource allocation, which comprises communication settings between the plurality of mobile stations 10, 11, 12, 20 and the radio base station 30.

For example, when the radio control station 40 notifies that the communication setting of the mobile station 10, which is carrying out communications at 64 kbps using the DPCH (Dedicated Physical Channel) in both the downlink and the uplink, is to be changed to 32 kbps communications using the DPCH in both the downlink and uplink, the call processing portion 312 changes the communication setting between the mobile station 10 and the radio base station 30 to 32 kbps communications using the DPCH in both the downlink and uplink.

Further, for example, when the radio control station 40 notifies that the communication setting of the mobile station 10, which is carrying out communications at 64 kbps using the DPCH in both the downlink and the uplink, is to be changed to CELL_FACH communications using a FACH (Forward Access Channel; a downlink access channel) for the downlink, and a RACH (Random Access Channel) for the uplink, the call processing portion 312 changes the communication settings between the mobile station 10 and the radio base station 30 from 64 kbps using the DPCH in both the downlink and the uplink to CELL_FACH communications using the FACH for the downlink, and the RACH for the uplink.

The resource monitoring portion 313 receives a plurality of congestion parameters (that is, downlink and uplink baseband resource usage, downlink transmission power, and so forth) from the layer one processing portion 311, and notifies these parameters to the radio control station 40 via the transmission interface 306.

By using a constitution like that described above, the radio base station 30 can acquire a plurality of congestion parameters related to congestion-generating factors, which is a factor generating congestion in the mobile communication system 1, and can transmit these parameters to the radio control station 40. Further, the radio base station 30 receives control instructions from the radio control station 40 for controlling the communication settings between the plurality of mobile stations 10, 11, 12, 20 and the radio base station 30, and based on these control instructions, can control the communication settings between the radio base station 30 and at least one of this plurality of mobile stations 10, 11, 12, 20. Further, as described hereinabove, the plurality of congestion parameters acquired by the layer one processing portion 311 of the radio base station 30 include baseband resource usage, transmission power, and so forth.

Next, the elements constituting the radio control station 40 and the functions thereof will be explained.

Figure 7:
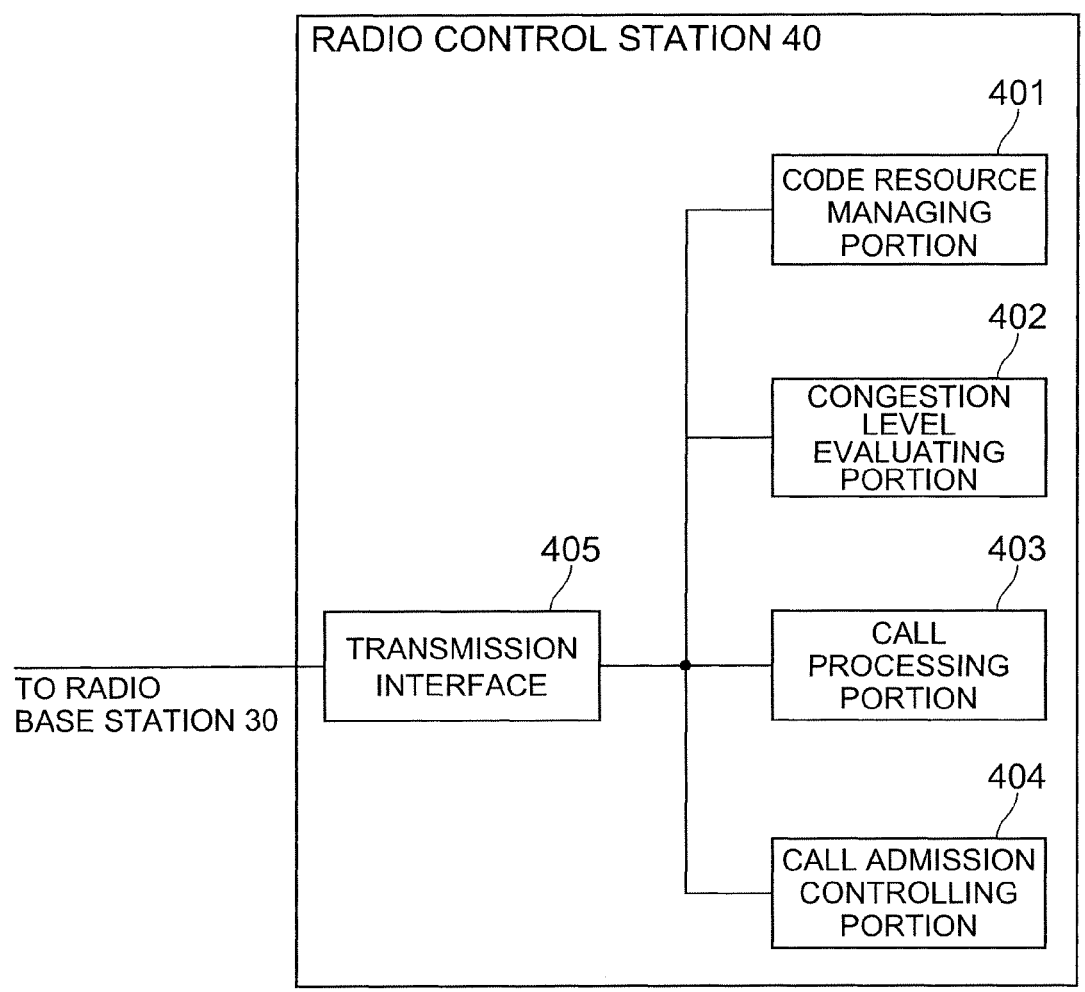
FIG. 7 is a functional block diagram of a radio control station constituting the mobile communication system.

FIG. 7 is a block diagram showing the functional constitution of the radio control station 40. The radio control station 40, as shown in FIG. 7, functionally comprises a code resource managing portion 401, a congestion level evaluating portion 402 (reception means, evaluation means), a call processing portion 403 (instruction generating means), a call admission controlling portion 404 (instruction generating means), and a transmission interface 405 (reception means, transmission means). Furthermore, the description of the functions of the radio control station 40 in FIG. 7 focuses on those functions relevant to a communication control method related to the present invention, and other functions have been omitted.

Figure 8:
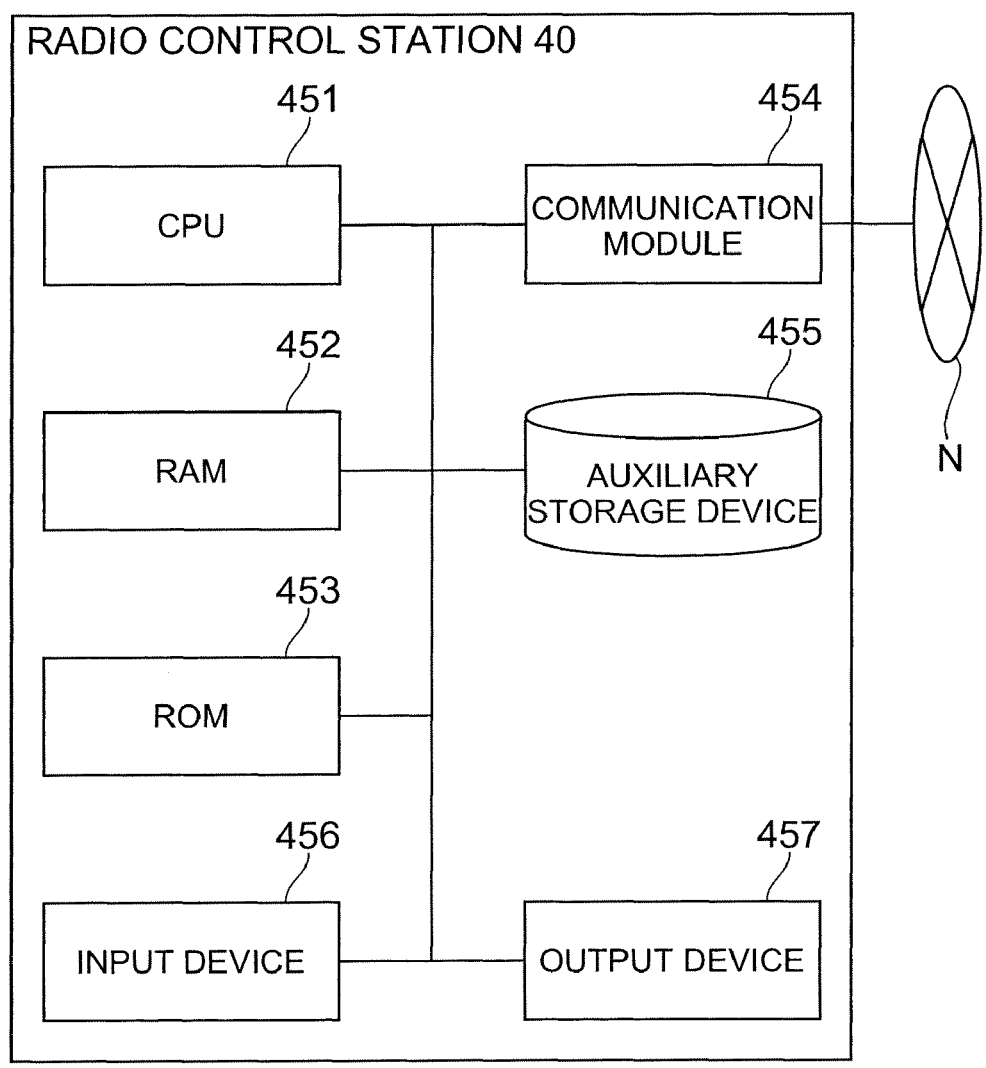
FIG. 8 is a diagram showing the hardware configuration of the radio control station constituting the mobile communication system.

FIG. 8 is a diagram showing an example of the hardware configuration of the radio control station 40. The radio control station 40, as shown in FIG. 8, is physically constituted as a communications device comprising a CPU 451, a RAM 452 and a ROM 453, which are storage devices, a communication module 454, which is a transmitter/receiver device for carrying out communications via a communication network N, an auxiliary storage device 455 such as a hard disk drive, an input device 456 and output device 457 for carrying out input/output related to the processing of the CPU 451. The respective functions explained in FIG. 7 are realized by reading prescribed computer software into the CPU 451, RAM 452 and other hardware shown in FIG. 8, and operating the communication module 454 and so forth under CPU 451 control to carry out data read/write from/to RAM 452 and ROM 453.

The respective functional elements of the radio control station 40 will be explained below using FIG. 7.

The code resource managing portion 401, the congestion level evaluating portion 402, the call processing portion 403, and the call admission controlling portion 404 are interconnected. Further, these components are also connected to the radio base station 30 by way of the transmission interface 405. More specifically, the code resource managing portion 401, the congestion level evaluating portion 402, the call processing portion 403, and the call admission controlling portion 404 are connected to the call processing portion 312 and the resource monitoring portion 313 in the radio base station 30 by way of the transmission interface 405.

The code resource managing portion 401 (parameter acquisition means) measures downlink code usage, which is a congestion parameter, and notifies this measurement to the congestion level evaluating portion 402. Code usage as used here is channelization code usage, and is a value computed taking into account the spreading ratio of the respective codes.

The congestion level evaluating portion 402 evaluates the congestion degree corresponding to the plurality of congestion parameters acquired from the resource monitoring portion 313 of the radio base station 30 by way of the transmission interface 405, and the congestion parameter acquired from the code resource managing portion 401. Congestion degree here is equivalent to a congestion level (that is, the extent of congestion) estimated based on congestion parameters, and shows the state of communication congestion in the mobile communication system 1. This congestion degree is depicted as a plurality of congestion levels, which are set in stages corresponding to the congestion parameters. More specifically, a congestion level can be divided into no less than three stages, and a higher congestion degree is set in a higher congestion level than in a lower congestion level. For example, when a congestion degree is depicted by three congestion levels, this congestion degree is divided into three stages and set as a first congestion level, a second congestion level, which depicts a lower congestion degree than the first congestion level, and a third congestion level, which depicts a congestion degree that is lower than the second congestion level. That is, when a congestion degree is depicted by a plurality of congestion levels, a (n+1)th congestion level can be set to depict a lower congestion degree than an nth congestion level, where n represents an arbitrary natural number.

This congestion level evaluating portion 402 acquires a notification concerning downlink code usage from the code resource managing portion 401. Further, the congestion level evaluating portion 402 acquires notifications concerning downlink and uplink baseband resource usage, and downlink transmission power from the resource monitoring portion 313 of the radio base station 30 by way of the transmission interface 405. Then, the congestion level evaluating portion 402 evaluates the congestion degree corresponding to the respective acquired plurality of congestion parameters. That is, the congestion level evaluating portion 402 respectively evaluates the congestion degrees corresponding to downlink code usage, downlink and uplink baseband resource usage, and downlink transmission power. In addition, the congestion level evaluating portion 402 stores the evaluated congestion degrees.

The evaluation of a congestion degree by the congestion level evaluating portion 402 will be explained in detail hereinbelow. Furthermore, in this embodiment, an example is given of a situation in which a congestion degree is divided into the three stages of congestion level A, congestion level B, which depicts a lower congestion degree than congestion level A, and congestion level C, which depicts a lower congestion degree than congestion level B.

First, with regard to downlink code usage, the congestion level evaluating portion 402 maintains a table like that shown in FIG. 9, and evaluates the congestion degree by referencing the downlink code usage and this table. More specifically, the congestion level evaluating portion 402 evaluates the congestion degree as congestion level A when the downlink code usage is between 70% and 100%, evaluates the congestion degree as congestion level B when this code usage is between 30% and 70%, and evaluates the congestion degree as congestion level C when this code usage is between 0% and 30%. Furthermore, the downlink code usage is given as a relative value in FIG. 9, but an absolute value can be used.

Further, with regard to downlink baseband resource usage, the congestion level evaluating portion 402 maintains a table like that shown in FIG. 10, and evaluates the congestion degree by referencing the downlink baseband resource usage and this table. More specifically, the congestion level evaluating portion 402 evaluates the congestion degree as congestion level A when the downlink baseband resource usage is between 70% and 100%, evaluates the congestion degree as congestion level B when this baseband resource usage is between 30% and 70%, and evaluates the congestion degree as congestion level C when this baseband resource usage is between 0% and 30%. Furthermore, the downlink baseband resource usage is given as a relative value in FIG. 10, but an absolute value can be used.

FIG. 10 shows a table in which the congestion level is evaluated using downlink baseband resource usage, but the congestion level can be evaluated in the same way using uplink baseband resource usage instead of downlink baseband resource usage. Further, the congestion level can also be evaluated using the baseband resource usage of both the downlink and the uplink. When using the baseband resource usage of both the downlink and uplink, the largest of the two baseband resource usages can be used as the baseband resource usage for referencing the table. Further, the average value of downlink baseband resource usage and uplink baseband resource usage can be utilized as the baseband resource usage for referencing the table, or the smallest of the downlink baseband resource usage and uplink baseband resource usage can be utilized as the baseband resource usage for referencing the table.

Also, with regard to downlink transmission power, the congestion level evaluating portion 402 maintains a table like that shown in FIG. 11, and evaluates the congestion degree by referencing the downlink transmission power and this table. More specifically, the congestion level evaluating portion 402 evaluates the congestion degree as congestion level A when the downlink transmission power is 41 dBm or more, evaluates the congestion degree as congestion level B when this transmission power is 39 dBm or more but less than 41 dBm, and evaluates the congestion degree as congestion level C when this transmission power is less than 39 dBm. Furthermore, the downlink transmission power is given as an absolute value in FIG. 11, but a relative value can be used. In this case, the congestion level can be evaluated using a relative value for the transmission power set as the criteria.

Further, a prescribed hysteresis can be imparted to congestion level evaluations, which use the tables shown in FIGS. 9 through 11 described above. More specifically, when changing a congestion level subsequent to storing this congestion level, which depicts the congestion degree corresponding to any of the plurality of congestion parameters of the above-mentioned code usage, baseband resource usage, and transmission power, the congestion level evaluating portion 402 of the radio control station 40 can make the first threshold for raising this congestion level higher than the second threshold for lowering this congestion level.

FIG. 12 shows a table, which sets the raising-threshold, which is the first threshold, and the lowering-threshold, which is the second threshold, related to downlink baseband resource usage. More specifically, when a notification that downlink baseband resource usage is 80% or higher is acquired in a state in which congestion level B is stored, the congestion level evaluating portion 402 raises the congestion level by evaluating this level as congestion level A. Further, when a notification that downlink baseband resource usage is between 30% and 70% is acquired in a state in which congestion level A is stored, the congestion level evaluating portion 402 lowers the congestion level by evaluating this level as congestion level B. Similarly, when a notification that downlink baseband resource usage is between 40% and 80% is acquired in a state in which congestion level C is stored, the congestion level evaluating portion 402 raises the congestion level by evaluating this level as congestion level B. Also, when a notification that downlink baseband resource usage is less than 30% is acquired in a state in which congestion level B is stored, the congestion level evaluating portion 402 lowers the congestion level by evaluating this level as congestion level C.

Thus, frequent changes in the congestion degree in response to fluctuations in congestion parameters in a short period of time can be reduced by making the first threshold for raising the congestion level higher than the second threshold for lowering the congestion level. Therefore, since the frequency with which the communication settings between the radio base station and the mobile station are controlled by control instructions from the radio control station can be held in check, it is possible to reduce excessive loads placed on the respective components of the mobile communication system.

Furthermore, the prescribed hysteresis in the congestion level evaluation does not have to be a threshold-set hysteresis like that described hereinabove. Rather, it can be a hysteresis, which prohibits either raising or lowering the congestion level for a prescribed time in accordance with the congestion level stored in the congestion level evaluating portion 402.

The congestion level evaluating portion 402 evaluates the congestion degree as described above, and notifies the call processing portion 403 and the call admission controlling portion 404 of the congestion degree corresponding to each of the plurality of congestion parameters.

The call processing portion 403 acquires the congestion degree corresponding to each of the plurality of congestion parameters from the congestion level evaluating portion 402. Then, when at least one of the plurality of congestion degrees obtained from the congestion level evaluating portion 402 is a prescribed level or more, the call processing portion 403 generates a control instruction for controlling the communication setting between the radio base station 30 and at least one of the plurality of mobile stations 10, 11, 12, 20.

More specifically, when congestion level B is the prescribed level for generating a control instruction, and at least one of the plurality of congestion degrees evaluated by the congestion level evaluating portion 402 is congestion level B or higher (that is, either congestion level A or congestion level B), the call processing portion 403 generates a control instruction for controlling the communication setting between the radio base station 30 and at least one of the plurality of mobile stations 10, 11, 12, 20. For example, when the congestion degrees evaluated by the congestion level evaluating portion 402 are congestion level C for downlink code usage, congestion level B for downlink baseband resource usage, and congestion level A for downlink transmission power, the call processing portion 403 generates a control instruction for controlling the communication setting in accordance with either congestion level A or congestion level B.

Furthermore, when a plurality of congestion degrees are a prescribed level or more, it is desirable that the control instruction generated by the call processing portion 403 be a control instruction for controlling the communication setting in accordance with the highest congestion degree. As in the example described above, when congestion level B has been evaluated for downlink baseband resource usage, and congestion level A has been evaluated for downlink transmission power, it is desirable that the call processing portion 403 generate a control instruction for controlling the communication setting in accordance with congestion level A.

Next, a control instruction generated by the call processing portion 403 will be explained. This control instruction is generated by the call processing portion 403 in accordance with the congestion degree, and when at least one of the plurality of congestion degrees evaluated by the congestion level evaluating portion 402 is a prescribed level or more (for example, when this congestion degree is either congestion level A or congestion level B), the control instruction changes the communication setting so as to restrict communications between the radio base station 30 and at least one of the plurality of mobile stations 10, 11, 12, 20.

For example, the constitution is such that when the call processing portion 403 generates a control instruction, which conforms to congestion level B, the determination is made to change the communication setting for the mobile station 10, which is carrying out communications at 64 kbps using the DPCH for both the downlink and the uplink, to communications at 32 kbps using the DPCH in both the downlink and the uplink, and a control instruction for changing the communication setting between the mobile station 10 and the radio base station 30 is notified to the mobile station 10 and the call processing portion 312 of the radio base station 30.

Further, for example, the constitution is such that when the call processing portion 403 generates a control instruction, which conforms to congestion level A, the determination is made to change the communication setting for the mobile station 10, which is carrying out communications at 64 kbps using the DPCH for both the downlink and the uplink, to CELL_FACH communications using FACH in the downlink and RACH in the uplink, and a control instruction for changing the communication setting between the mobile station 10 and the radio base station 30 is notified to the mobile station 10 and the call processing portion 312 of the radio base station 30.

Up until here, a situation in which the call processing portion 403 generates a control instruction in accordance with the congestion degree alone has been explained, but the constitution can be such that the call processing portion 403 generates a control instruction in accordance with a congestion degree and a priority.

As used here, priority is a parameter set for a mobile station in a mobile communication system to provide different communication services according to the user. As an example of this priority, there are parameters, which are set in accordance with a priority class (a classification given to a mobile station for providing a prescribed user with priority service), a type of service and a type of contract. The constitution can be such that the priorities set for the respective mobile stations are stored in the congestion level evaluating portion 402 of the radio control station, and notified to the call processing portion 403 and the call admission controlling portion 404 for generating a control instruction, together with the congestion degree corresponding to the plurality of congestion parameters.

When the call processing portion 403 generates a control instruction in accordance with a congestion degree and priority, the call processing portion 403 can be specifically constituted as follows.

For example, when a first priority is set in the mobile station 11, and a second priority is set in the mobile station 12, and the first priority is a higher priority than the second priority, the constitution can be such that the call processing portion 403 generates a control instruction, which changes the communication setting for restricting communications between the mobile station 12 and the radio base station 30.

Further, for example, when the second priority is set for a plurality of mobile stations, the constitution can be such that the call processing portion 403 generates a control instruction, which changes the communication setting as described hereinabove, but only for the mobile station, which has been communicating for the longest time. More specifically, when the second priority is set for all of the mobile stations 10, 11, 12, and their respective communication times are 3, 5 and 10 minutes, the constitution can be such that the call processing portion 403 generates a control instruction, which changes the communications settings to restrict communications between the radio base station 30 and the two mobile stations that have been communicating for the longest times. Furthermore, in this case, the communications settings between the radio base station 30 and both the mobile station 11 and the mobile station 12 are changed.

Also, for example, when there are mobile stations for which high-priority contracts are in effect, and mobile stations for which low-priority contracts are in effect, the constitution can be such that the call processing portion 403 generates a control instruction, which only changes the communications settings as described hereinabove for mobile stations for which low-priority contracts are in effect. Further, the constitution can also be such that the call processing portion 403 generates a control instruction, which only changes the communications setting as described hereinabove for the mobile station, of the low-priority contract mobile stations, which has been communicating for the longest time. More specifically, when the mobile stations 10, 11, 12 have low-priority contracts, and their respective communication times are 3, 5 and 10 minutes, the constitution can be such that the call processing portion 403 generates a control instruction, which changes the communications setting to restrict communications between the radio base station 30 and the one mobile station that has been communicating for the longest time. Furthermore, in this case, the communications setting between the radio base station 30 and the mobile station 12 is changed.

Further, for example, the constitution can be such that the call processing portion 403 generates a control instruction, which changes the communications settings as described hereinabove based on the types of service for each of the mobile stations 10, 11, 12, which are carrying out communications in the cell 50. For example, when there are mobile stations for which VoIP (Voice over IP) services are being provided, and mobile stations for which best effort packet communication services are being provided, the constitution can be such that the call processing portion 403 generates a control instruction, which only changes the communications settings as described hereinabove for mobile stations being provided with best effort packet communication services. Further, the constitution can also be such that the call processing portion 403 generates a control instruction, which only changes the communications settings as described hereinabove for the mobile station, of the mobile stations being provided with best effort packet communication services, which has been communicating for the longest time. For example, when the mobile stations 10, 11, 12 have contracts for best effort packet communication services, and their respective communication times are 3, 5 and 10 minutes, the constitution can be such that the call processing portion 403 generates a control instruction, which changes the communications setting to restrict communications between the radio base station 30 and the one mobile station that has been communicating for the longest time. In this case, the above-described communications setting change is carried out for the mobile station 12.

Furthermore, the constitution can also be such that the call processing portion 403 generates a control instruction, which changes the communications settings as described hereinabove by setting terminal type and user identifier as examples of priorities instead of just the above-mentioned priority class, contract type and service type. Here, terminal type refers to classifying the performance of a mobile station, which is the destination for downlink data, and comprises classifications based on mobile station identification information, the presence/absence or type of RAKE receiver function, equalizer, reception diversity, and interference canceller, and the modulation mode, number of codes, and number of bits capable of being received. Further, user identifier, for example, refers to an identifier based on the identification information of a mobile station, or a user contract ID.

Employing a constitution such that the call processing portion 403 generates a control instruction in accordance with the congestion degree and priority like this makes it possible to manage communications quality, which conforms to priorities set in the respective mobile stations 10, 11, 12, 20, for the state of congestion of the mobile communication system 1. In the mobile communication system 1, there are generally a plurality of contract types, which include a high-priority contract type and a low-priority contract type. In a case like this, preferential treatment can be given to a user with a high-priority contract type over a user with a low-priority contract type.

The generation of a control instruction by the call processing portion 403 for controlling the communications setting between the radio base station 30 and at least one of the plurality of mobile stations 10, 11, 12, 20, can be carried out every prescribed time period. For example, the constitution can be such that the call processing portion 403 generates a control instruction, which changes the communications settings for two mobile stations every minute.

In addition, the generation of a control instruction by the call processing portion 403 can also be carried out by assigning an order of precedence to processing based on the size of the transmission rate. For example, when carrying out a change of communications settings as described above, if a mobile station, which is carrying out communications at 384 kbps using DPCH for both the downlink and uplink, coexists with a mobile station, which is carrying out communications at 64 kbps using DPCH for both the downlink and uplink, the constitution can be such that, first of all, the call processing portion 403 generates a control instruction, which preferentially changes the communications setting for the mobile station, which is carrying out communications at 384 kbps using DPCH for both the downlink and uplink, for example, a control instruction, which changes from the state in which communications are carried out at 384 kbps to a state in which communications are carried out at 64 kbps.

Furthermore, in the above-mentioned example, a situation in which the uplink transmission rate is the same as the downlink transmission rate was explained, but the uplink transmission rate and downlink transmission rate can be different. Further, as mentioned hereinabove, when an order of precedence is assigned to processing based on the size of the transmission rate, for example, the processing order of precedence can be assigned based solely on the size of the transmission rate of the downlink.

In general, when data to be communicated in the uplink or downlink is generated, the radio control station 40 changes (transitions) a mobile station, which is in a CELL_FACH state, to a CELL_DCH state. Here, the CELL_FACH state is one in which communications is carried out using FACH for the downlink, and RACH for the uplink, and the CELL_DCH state is one in which communications are carried out using DCH (Dedicated Channel) for both the downlink and the uplink. Accordingly, for example, when any of the congestion degrees evaluated by the congestion level evaluating portion 402 is congestion level A, the call processing portion 403 can determine not to change (transition) from the CELL_FACH state to the CELL_DCH state as mentioned hereinabove.

Further, the radio control station generally changes the transmission rate of the uplink based on the quantities of data inside the transmission buffers of the respective mobile stations and the uplink transmission rate. For example, when the data quantity inside the transmission buffer of the mobile station 10 exceeds a prescribed threshold, a change process which changes the uplink transmission rate of the mobile station 10 from 32 kbps to 64 kbps is carried out. Accordingly, for example, the call processing portion 403 can generate a control instruction, which does not change the transmission rate of the uplink as described hereinabove, when the congestion degree is congestion level A.

Further, the radio control station generally changes the downlink transmission rate based on the quantity of data inside the transmission buffer of the radio control station and the downlink transmission rate. For example, when the quantity of the mobile station 10 addressed data inside the transmission buffer of the radio control station 40 exceeds a prescribed threshold, a change process which changes the downlink transmission rate of the mobile station 10 from 64 kbps to 384 kbps is carried out. Accordingly, for example, the call processing portion 312 can generate a control instruction, which does not change the transmission rate of the downlink as described hereinabove, when the congestion degree is congestion level A.

Furthermore, the same as the situation described hereinabove, a determination not to change from the CELL_FACH state to the CELL_DCH state described above based on priority, and either a determination not to change the transmission rate of the uplink, or a determination not to change the transmission rate of the downlink can be carried out. For example, when there are mobile stations, which are set at the first priority, and mobile stations, which are set at the second priority, and the first priority is a higher priority than the second priority, the constitution can be such that the call processing portion 403 generates a control instruction, which controls the communications settings between the radio base station 30 and at least one of the plurality of mobile stations 10, 11, 12, 20 based on a determination not to change from the CELL_FACH state to the CELL_DCH state described above, a determination not to change the transmission rate of the uplink, or a determination not to change the transmission rate of the downlink only for mobile stations set to the second priority.

Next, the call admission controlling portion 404 will be explained.

The call admission controlling portion 404 acquires a congestion degree corresponding to each of a plurality of congestion parameters from the congestion level evaluating portion 402. Then, when at least one of the plurality of congestion degrees obtained by the congestion level evaluating portion 402 is a prescribed level or more, the call admission controlling portion 404 makes a determination as to whether or not to reject a communication from mobile station 20, which, of the plurality of mobile stations 10, 11, 12, 20, is attempting to start a new communication.

More specifically, the constitution can be such that, when the congestion degree is a prescribed level or more (for example, congestion level A), the call admission controlling portion 404 makes a determination that the mobile station 20 cannot start a new communication, that is, a determination to reject a communication from the mobile station 20.

Furthermore, the determination by the call admission controlling portion 404 as to whether or not to reject a new communication from the mobile station 20 can be carried out based on the priority of the mobile station 20. For example, when there are mobile stations, which are set to the first priority, and mobile stations, which are set to the second priority inside the cell 50, and the first priority is a higher priority than the second priority, the constitution can be such that the call admission controlling portion 404 denies a communication from mobile station 20 only when the mobile station 20 belongs to the second priority.

Also, the determination by the call admission controlling portion 404 as to whether or not to reject a new communication from the mobile station 20 can be carried out based on the contract type of the mobile station 20. For example, when there are mobile stations for which a low-priority contract is in effect, and mobile stations for which a high-priority contract is in effect, the constitution can be such that the call admission controlling portion 404 denies a communication from the mobile station 20 only when the mobile station 20 is a mobile station for which a low-priority contract is in effect.

Further, the determination by the call admission controlling portion 404 as to whether or not to reject a new communication from the mobile station 20 can be carried out based on the service type of the mobile station 20. For example, when there are mobile stations, which are being provided with VoIP services, and mobile stations, which are being provided with best effort packet communication services, the constitution can be such that the call admission controlling portion 404 denies a communication from the mobile station 20 only when the service being provided to the mobile station 20 is a best effort packet communication service.

Further, the constitution can also be such that the call admission controlling portion 404 makes a determination as to whether or not to reject a new communication from the mobile station 20 based on a terminal type and a user identifier as examples of priorities in addition to the above-mentioned priority class, contract type and service type. Here, terminal type refers to classifying the performance of a mobile station, which is the destination for a downlink packet, and comprises classifications based on mobile station identification information, the presence/absence or type of RAKE receiver function, equalizer, reception diversity, and interference canceller, and the modulation mode, number of codes, and number of bits capable of being received. Further, user identifier, for example, refers to an identifier based on the identification information of a mobile station, or a user contract ID.

Furthermore, when the call admission controlling portion 404 decides to admit rather than reject a communication from the mobile station 20, the call admission controlling portion 404 executes processing for the mobile station 20 to commence communications in the cell 50. That is, the call admission controlling portion 404 controls the communications settings between the radio base station 30 and the mobile station 20 by notifying the radio base station 30 and the mobile station 20 of the control instruction for starting communications. Conversely, when the call admission controlling portion 404 decides to reject a communication from the mobile station 20, the call admission controlling portion 404 does not execute processing for the mobile station 20 to start a new communication in the cell 50. In this case, the communication, which the mobile station 20 attempted to start, results in a lost call.

Employing a constitution like that described above makes it possible for the radio control station 40 to evaluate congestion degrees corresponding to a plurality of congestion parameters related to congestion-generating factors in the mobile communication system 1, and, when at least one of the plurality of congestion degrees obtained is a prescribed level or more, to generate a control instruction for controlling the communications settings between the radio base station 30 and at least one of the plurality of mobile stations 10, 11, 12, 20, and to transmit this control instruction to the radio base station 30 and at least one of the plurality of mobile stations 10, 11, 12, 20.

Next, a communication control method related to an embodiment of the present invention will be explained while referring to FIGS. 13 through 18. Furthermore, unless otherwise specified, the explanation will use the mobile station 10 as an example of a mobile station carrying out communications with the radio base station 30. Further, the explanation will use the mobile station 20 as an example of a mobile station attempting to start a new communication.

First, one example of the communication control methods related to the present invention, in which control of the communications settings between the radio base station 30 and the mobile station 10 is performed in accordance with a congestion degree, will be explained using the flowchart shown in FIG. 13.

Figure 13:
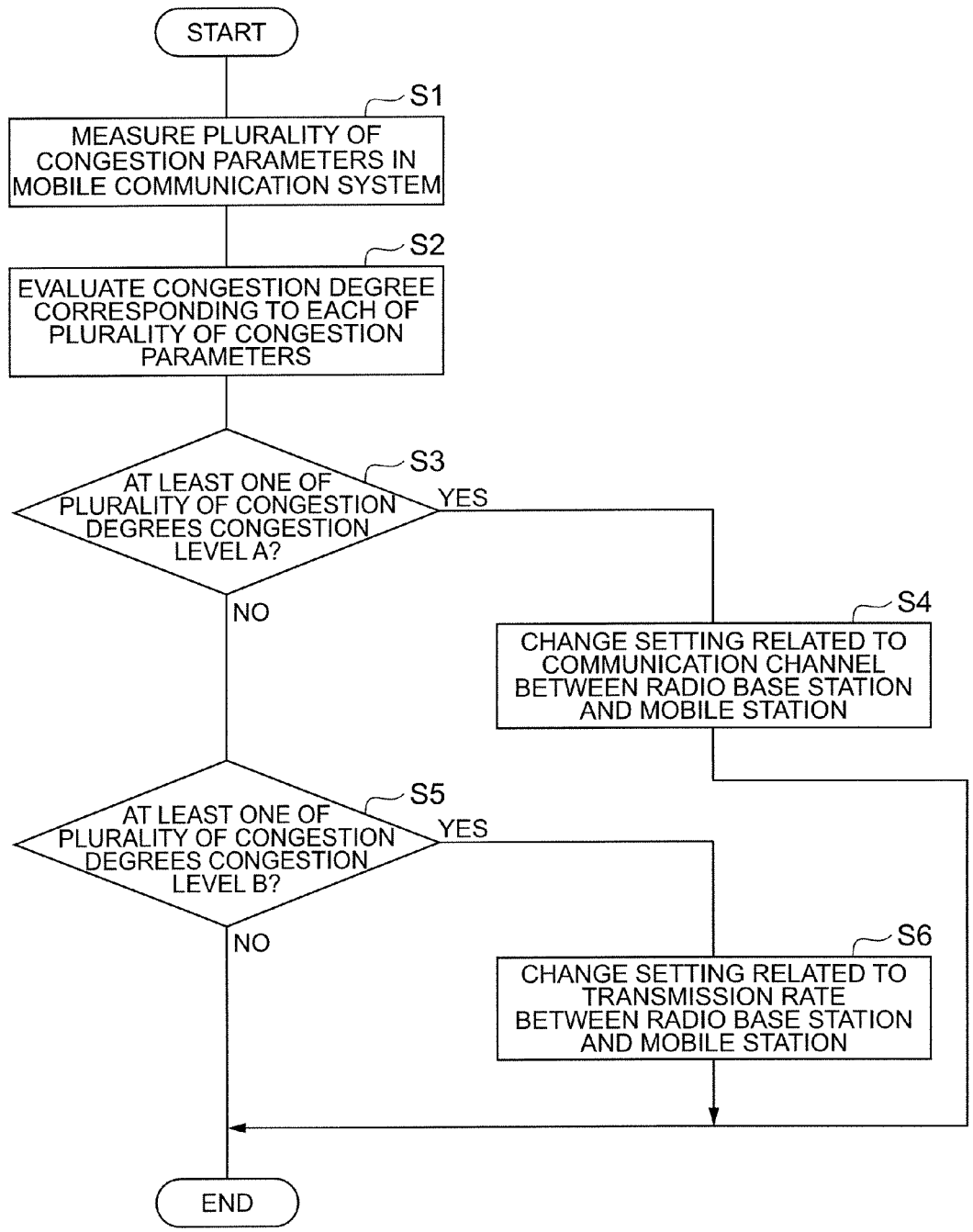
FIG. 13 is a flowchart describing an example of a process for controlling the communication setting between the radio base station and a mobile station in accordance with the congestion degree.

As shown in FIG. 13, first, in Step S1, a plurality of congestion parameters related to congestion-generating factors in the mobile communication system 1 are measured. More specifically, the layer one processing portion 311 of the radio base station 30 measures the downlink baseband resource usage, and the downlink transmission power. Further, the code resource managing portion 401 of the radio control station 40 measures the downlink code usage. The plurality of congestion parameters measured by the layer one processing portion 311 and the code resource managing portion 401 are notified to the congestion level evaluating portion 402 of the radio control station 40.

In Step S2, the congestion level evaluating portion 402 evaluates the congestion degrees corresponding to the respective notified downlink code usage, downlink baseband resource usage, and downlink transmission power. The evaluation of the congestion degrees can be carried out based on the tables shown in FIGS. 9 through 12 as described hereinabove. The plurality of congestion degrees evaluated by the congestion level evaluating portion 402 are notified to the call processing portion 403 of the radio control station 40.

In Steps S3 and S5, the call processing portion 403 determines whether or not at least one of the plurality of congestion degrees acquired from the congestion level evaluating portion 402 is a prescribed level or more. More specifically, in Step S3, the call processing portion 403 determines whether or not at least one of the plurality of congestion degrees is congestion level A, and if the determination is that at least one of the plurality of congestion degrees is congestion level A, the call processing portion 403 proceeds to Step S4, and if the determination is that none of the plurality of congestion degrees is congestion level A, the call processing portion 403 proceeds to Step S5.

In Step S4, the call processing portion 403 generates a control instruction, which changes the settings related to the communication channel between the radio base station 30 and the mobile station 10, and transmits this control instruction to the radio base station 30 by way of transmission interface 405. The radio base station 30, which receives the control instruction from the radio control station 40 by way of the transmission interface 306, changes the settings related to the communication channel between the radio base station 30 and the mobile station 10, and ends processing. Further, the control instruction, which changes the settings related to the communication channel between the radio base station 30 and the mobile station 10, is also notified to mobile station 10. When generating a control instruction like this, the call processing portion 403, for example, generates a control instruction, which changes the communication settings between the radio base station 30 and the mobile station 10, which are communicating at 64 kbps using the DPCH in the downlink and the uplink, to CELL_FACH communications, which use FACH for the downlink, and RACH for the uplink, and transmits this control instruction to the radio base station 30 and the mobile station 10.

In Step S5, the same as in Step S3, the call processing portion 403 determines whether or not at least one of the plurality of congestion degrees acquired from the congestion level evaluating portion 402 is a prescribed level or more. More specifically, in Step S5, the call processing portion 403 determines whether or not at least one of the plurality of congestion degrees is congestion level B, and when the determination is that at least one of the plurality of congestion degrees is congestion level B, the call processing portion 403 proceeds to Step S6, and when the determination is that none of the plurality of congestion degrees is congestion level B, the call processing portion 403 ends processing.

In Step S6, the call processing portion 403 generates a control instruction, which changes the settings related to the transmission rate between the radio base station 30 and the mobile station 10, and transmits this control instruction to the radio base station 30 by way of the transmission interface 405. The radio base station 30, which receives the control instruction from the radio control station 40 by way of the transmission interface 306, changes the settings related to the transmission rate between the radio base station 30 and the mobile station 10, and ends processing. Further, the control instruction, which changes the settings related to the transmission rate between the radio base station 30 and the mobile station 10, is also notified to mobile station 10. When generating a control instruction like this, the call processing portion 403, for example, generates a control instruction, which changes the communications settings between the radio base station 30 and the mobile station 10, which are communicating at 64 kbps using the DPCH in the downlink and the uplink, to communications at 32 kbps using DPCH for the downlink and the uplink, and transmits this control instruction to the radio base station 30 and the mobile station 10.

Furthermore, controlling the communication settings between the mobile station 10 and the radio base station 30 has been explained here, but needless to say, the above-mentioned processing as described in FIG. 13 can be targeted at all the mobile stations 10, 11, 12, which are carrying out communications inside cell 50. Further, this processing can also be targeted at the mobile station of the mobile stations 10, 11, 12, which has been communicating for the longest time. For example, processing can be carried out for controlling the communication settings for only the mobile stations with the first and second longest communication times.

Next, an example of controlling the communication settings between the radio base station 30 and the mobile station 10 in accordance with a congestion degree and the above-mentioned priority will be explained using the flowchart shown in FIG. 14. Furthermore, a situation in which mobile stations set to a first priority, and mobile stations set to a second priority exist in the mobile communication system 1, the first priority is a higher priority than the second priority, and control of communication settings is carried out only for mobile stations set to the second priority, will be explained.

Figure 14:
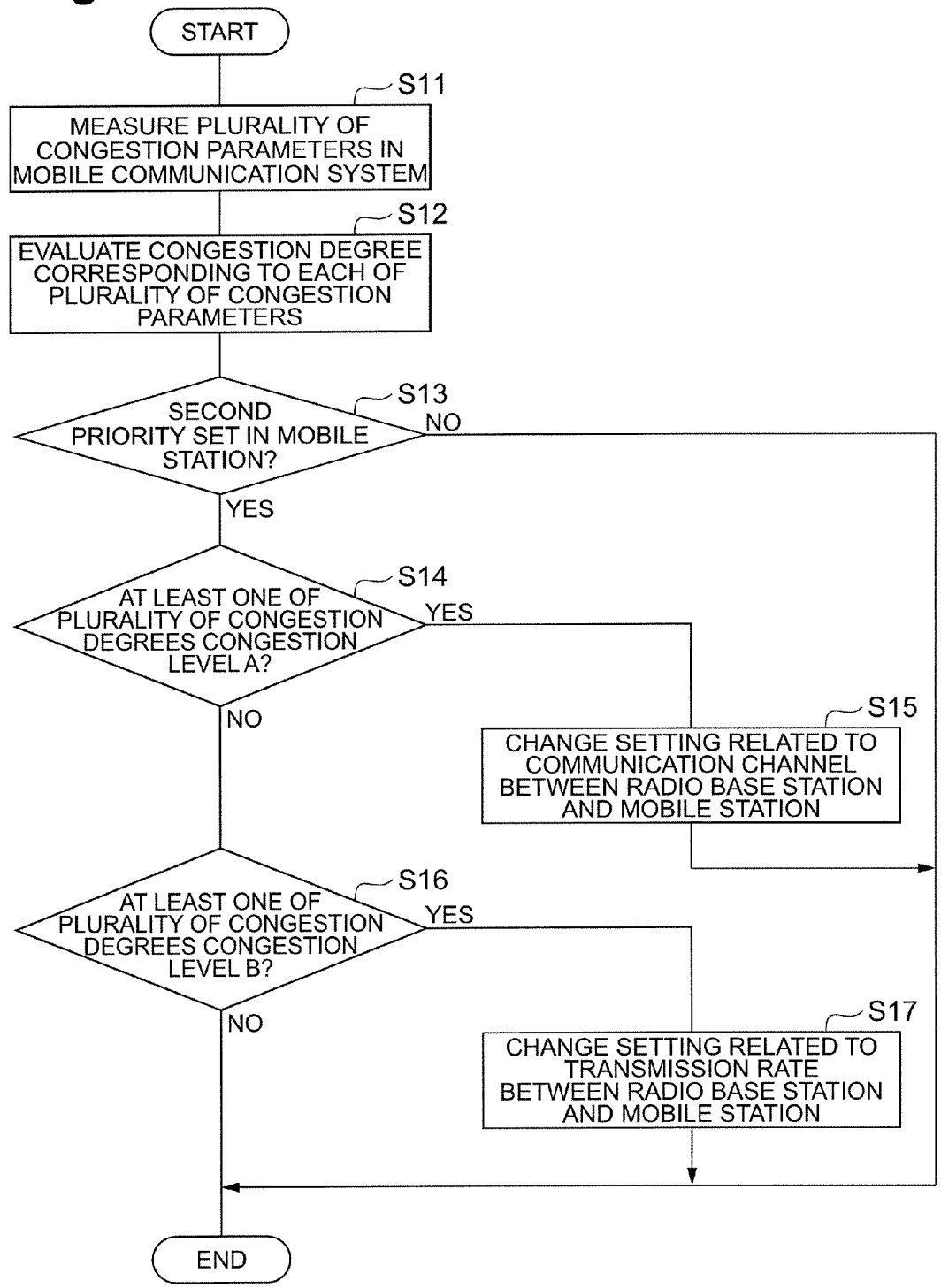
FIG. 14 is a flowchart describing an example of a process for controlling the communication setting between the radio base station and the mobile station in accordance with the congestion degree and the above-mentioned priority.

As shown in FIG. 14, first, in Step S11, a plurality of congestion parameters related to congestion-generating factors in the mobile communication system 1 are measures the same as in Step S1. The plurality of congestion parameters (that is, downlink baseband resource usage, transmission power and code usage) measured by the layer one processing portion 311 and the code resource managing portion 401 are notified to the congestion level evaluating portion 402 of the radio control station 40.

In Step S12, the congestion level evaluating portion 402 evaluates the congestion degree corresponding to the respective notified downlink code usage, downlink baseband resource usage, and downlink transmission power. The evaluation of the congestion degrees can be carried out based on the tables shown in FIGS. 9 through 12 as described hereinabove the same as in Step S2. The plurality of congestion degrees evaluated by the congestion level evaluating portion 402 is sent to the call processing portion 403 of the radio control station 40 together with the priority set in the mobile station.

In Step S13, the call processing portion 403 determines whether or not the second priority is set in the mobile station 10, and when it is determined that the second priority is set in the mobile station 10, the call processing portion 403 proceeds to Step S14, and when it is determined that the second priority is not set in the mobile station 10, the call processing portion 403 ends processing.

Since Steps S14, S15, S16, and S17 respectively correspond to Steps S3, S4, S5 and S6 shown in FIG. 13, duplicate explanations will be omitted hereinbelow.

Furthermore, needless to say, the above-mentioned processing as described in FIG. 14 can also be targeted at all the mobile stations, which are carrying out communications inside the cell 50, and which are set to the second priority. Also, the fact that processing for controlling communication settings can also be carried out for only the mobile station, of the mobile stations set to the second priority, which has been communicating for the longest time, is the same as the example described in FIG. 13.

Further, the above-mentioned processing can be carried out by taking into account any of the examples mentioned above, such as priority class, service type, contract type, terminal type and terminal identifier, as the priority.

Next, another example of controlling the communication settings between the radio base station 30 and the mobile station 10 in accordance with a congestion degree will be explained using the flowchart shown in FIG. 15. In the example described in FIG. 15, the processing in Steps S23 and S25 in which the call processing portion 403 determines that at least one of the plurality of congestion degrees acquired from the congestion level evaluation portion 402 is a prescribed level or more (that is, Steps S24 and S26) differs from the example described in FIG. 13.

More specifically, in Step S24, the call processing portion 403 ends the processing without generating a control instruction, which changes the setting related to the communication channel between the radio base station 30 and the mobile station 10. That is, the call processing portion 403 retains communications between the radio base station 30 and mobile station 10 without changing the settings related to this communications channel. In this case, the call processing portion 403 will decide not to change from CELL_FACH to CELL_DCH even in a situation in which the call processing portion 403 would change from CELL_FACH to CELL__DCH if the status related to the mobile station 10 was normal (there was no congestion).

Further, in Step S26, the call processing portion 403 ends the processing without generating a control instruction, which changes the setting related to the transmission rate between the radio base station 30 and the mobile station 10. That is, the call processing portion 403 retains communications between the radio base station 30 and the mobile station 10 without changing the settings related to this transmission rate. In this case, the call processing portion 403 will decide not to change the transmission rate of the uplink and downlink even in a situation in which the call processing portion 403 would change the transmission rate of the uplink and downlink if the status related to the mobile station 10 was normal (there was no congestion). Here, for example, there are times when changing the transmission rate of the uplink and downlink changes the transmission rate from 32 kbps to 64 kbps.

In addition, since Steps S21, S22, S23, and S25 respectively correspond to Steps S1, S2, S3 and S5 shown in FIG. 13, duplicate explanations will be omitted.

Figure 15:
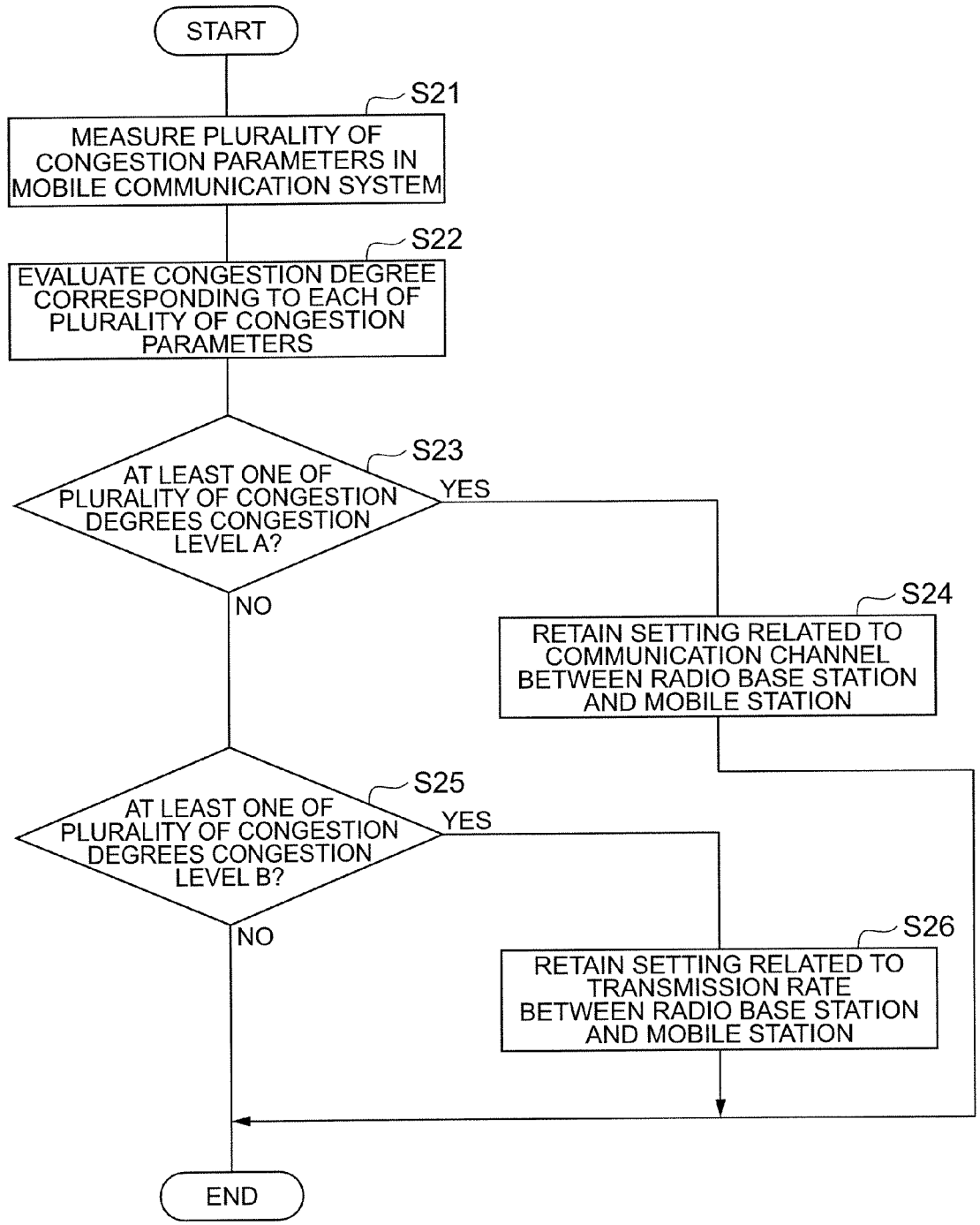
FIG. 15 is a flowchart describing another example of a process for controlling the communication settings between the radio base station and the mobile station in accordance with the congestion degree.

Furthermore, controlling the communication settings between the mobile station 10 and the radio base station 30 has been explained here, but needless to say, the above-mentioned processing as described in FIG. 15 can be targeted at all the mobile stations 10, 11, 12, which are carrying out communications inside cell 50, and can also be targeted solely at the mobile station, which has been communicating for the longest time as in the case shown in FIG. 13.

Next, another example of controlling the communication settings between the radio base station 30 and the mobile station 10 in accordance with a congestion degree and priority will be explained using the flowchart shown in FIG. 16. In the example described in FIG. 16, the processing in Steps S34 and S36 in which the call processing portion 403 determines that at least one of the plurality of congestion degrees acquired from the congestion level evaluation portion 402 is a prescribed level or more (that is, Steps S35 and S37) differs from the example described in FIG. 14.

More specifically, the same processing as that of Step S24 described in FIG. 15 is carried out as Step S35. In this Step S35, the call processing portion 403 ends the processing without generating a control instruction, which changes the setting related to the communication channel between the radio base station 30 and the mobile station 10. That is, the call processing portion 403 retains communications between the radio base station 30 and the mobile station 10 without changing the settings related to this communications channel.

Further, Step S37 carries out the same processing as that of Step S26 described in FIG. 15. In this Step S37, the call processing portion 403 ends the processing without generating a control instruction, which changes the setting related to the transmission rate between the radio base station 30 and the mobile station 10. That is, the call processing portion 403 retains communications between the radio base station 30 and the mobile station 10 without changing the settings related to this transmission rate.

In addition, since Steps S31, S32, S33, S34 and S36 respectively correspond to Steps S11, S12, S13, S14, and S16 shown in FIG. 14, duplicate explanations will be omitted.

Figure 16:
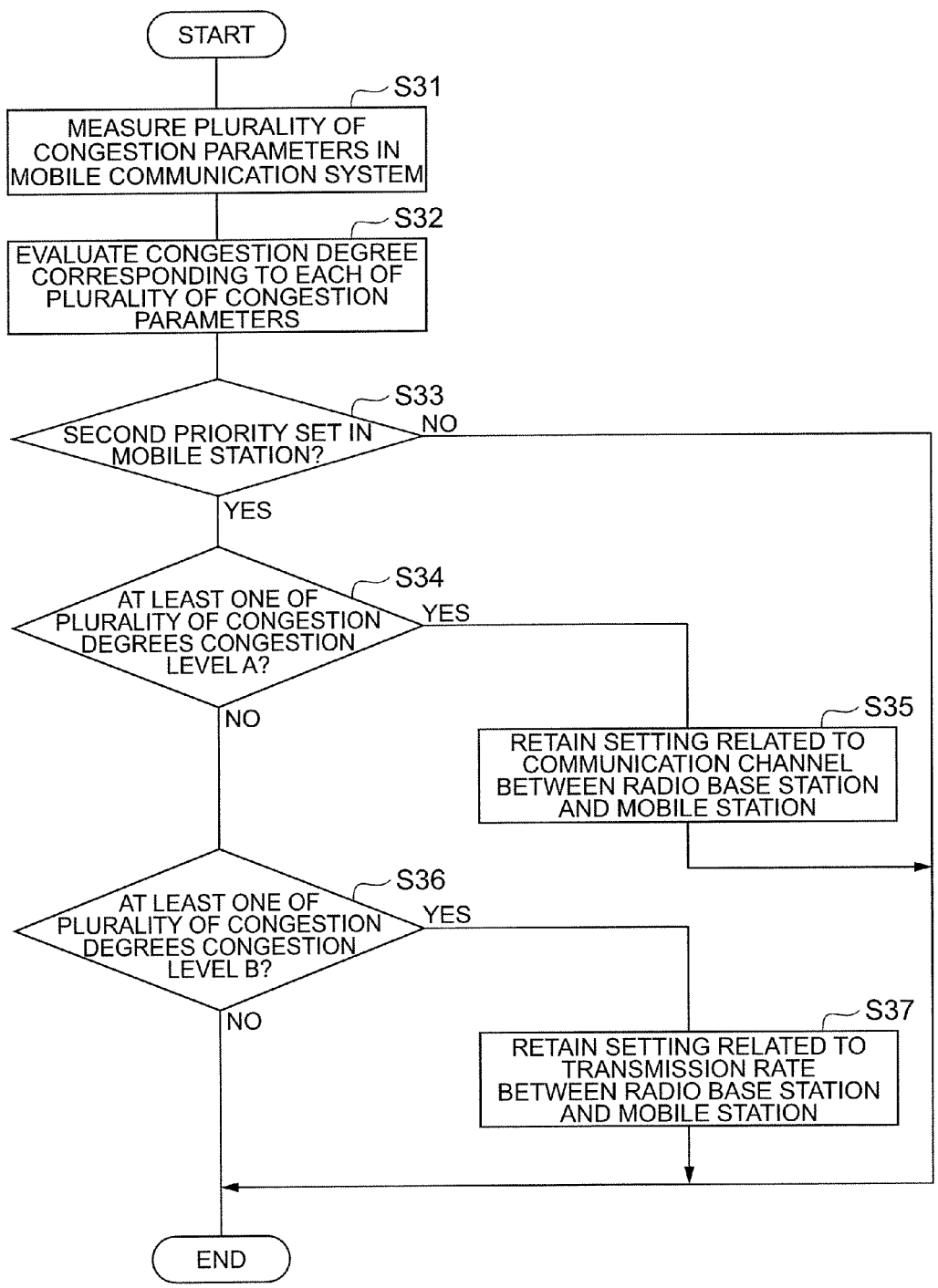
FIG. 16 is a flowchart describing another example of a process for controlling the communication settings between the radio base station and the mobile station in accordance with the congestion degree and the above-mentioned priority.

Furthermore, needless to say, the above-mentioned processing as described in FIG. 16 can also be targeted at all the mobile stations, which are carrying out communications inside the cell 50, and which are set to the second priority, the same as the situation of FIG. 14. Also, the fact that processing for controlling communication settings can also be carried out only for the mobile station, of the mobile stations set to the second priority, which has been communicating for the longest time, is the same as the example described in FIG. 14.

Further, the fact that the above-mentioned processing can be carried out by taking into account, as the priority, any of the examples mentioned above, such as priority class, service type, contract type, terminal type and terminal identifier, is the same as the situation described in FIG. 14.

Next, an example of controlling in accordance with a congestion degree the communication settings between the radio base station 30 and the mobile station 20, which is attempting to start a new communication with the radio base station 30 in the cell 50, will be explained using the flowchart shown in FIG. 17. In the example described in FIG. 17, the processing in Step S43 in which the call processing portion 403 determines that at least one of the plurality of congestion degrees acquired from the congestion level evaluation portion 402 is a prescribed level or more (that is, Step S44) differs from the example described in FIG. 13.

More specifically, in Step S42, the congestion level evaluating portion 402 evaluates the congestion degree corresponding to the respective notified downlink code usage, downlink baseband resource usage, and downlink transmission power. The evaluation of the congestion degrees can be carried out based on the tables shown in FIGS. 9 through 12 as described hereinabove the same as in Step S2. Unlike the example described in FIG. 13, the plurality of congestion degrees evaluated by the congestion level evaluating portion 402 is notified to the call admission controlling portion 404 of the radio control station 40.

Further, in Step S44, the call admission controlling portion 404 ends processing without generating a control instruction for starting a new communication between the radio base station 30 and the mobile station 20. That is, the call admission controlling portion 404 denies the communication from the mobile station 20, which is attempting to start a new communication. In this case, the call admission controlling portion 404 determines not to receive the new communication from the mobile station 20, and the communication, which the mobile station 20 attempted to start, results in a lost call.

In addition, since Steps S41 and S43 respectively correspond to Steps S1 and S13 shown in FIG. 13, duplicate explanations will be omitted. Furthermore, in this example, the processing corresponding to Steps S5 and S6 in the example described in FIG. 13 will be omitted.

Figure 18:
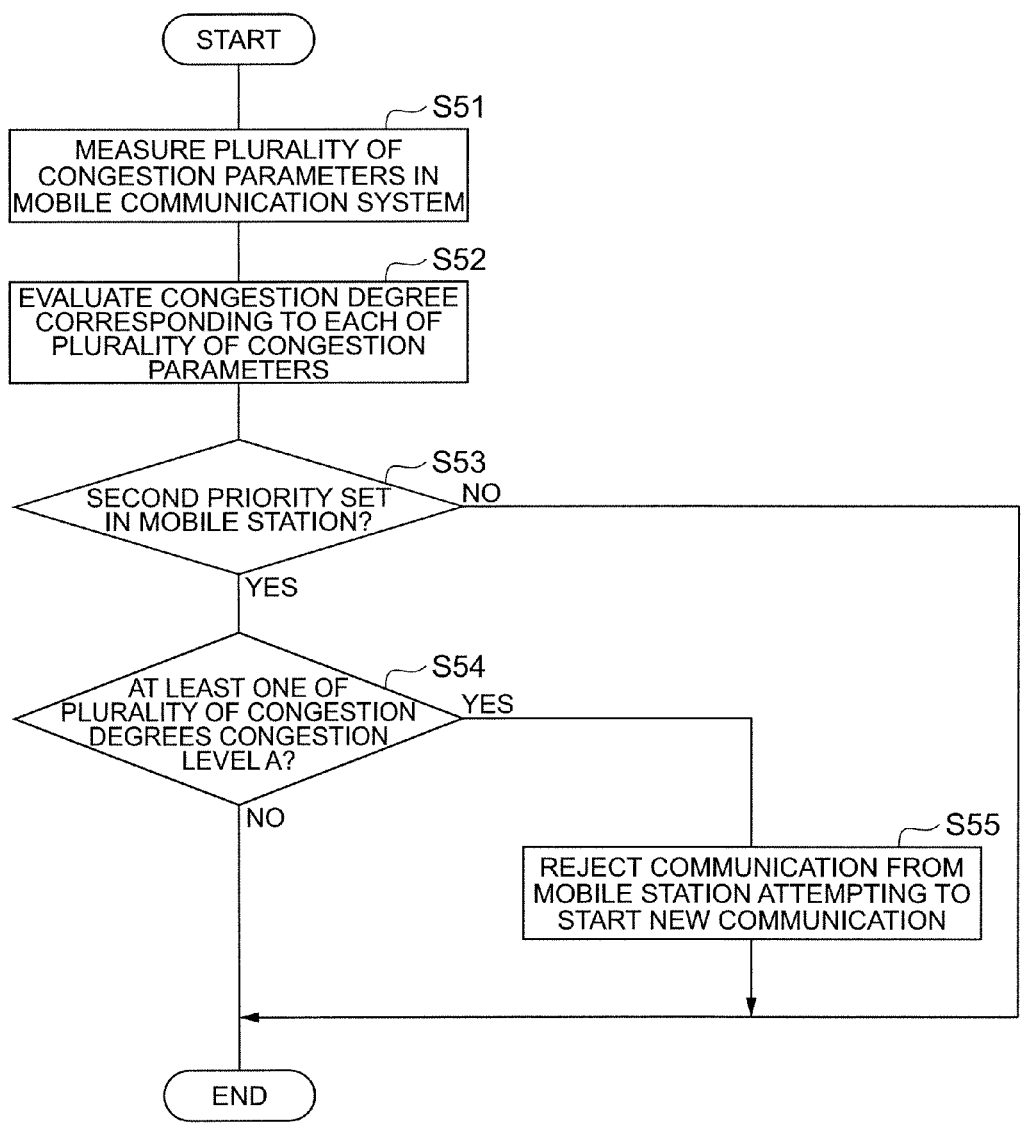
FIG. 18 is a flowchart describing another example of a process for controlling the communication settings between the radio base station and the mobile station in accordance with the congestion degree and the above-mentioned priority.

Next, another example of controlling the communication settings between the radio base station 30 and the mobile station 20, which is attempting to start a new communication with the radio base station 30 in the cell 50, will be explained in accordance with a congestion degree and the above-mentioned priority using the flowchart shown in FIG. 18. In the example described in FIG. 18, the processing in Step S54 in which the call processing portion 403 determines that at least one of the plurality of congestion degrees acquired from the congestion level evaluation portion 402 is a prescribed level or more (that is, Step S55) differs from the example described in FIG. 14.

Figure 17:
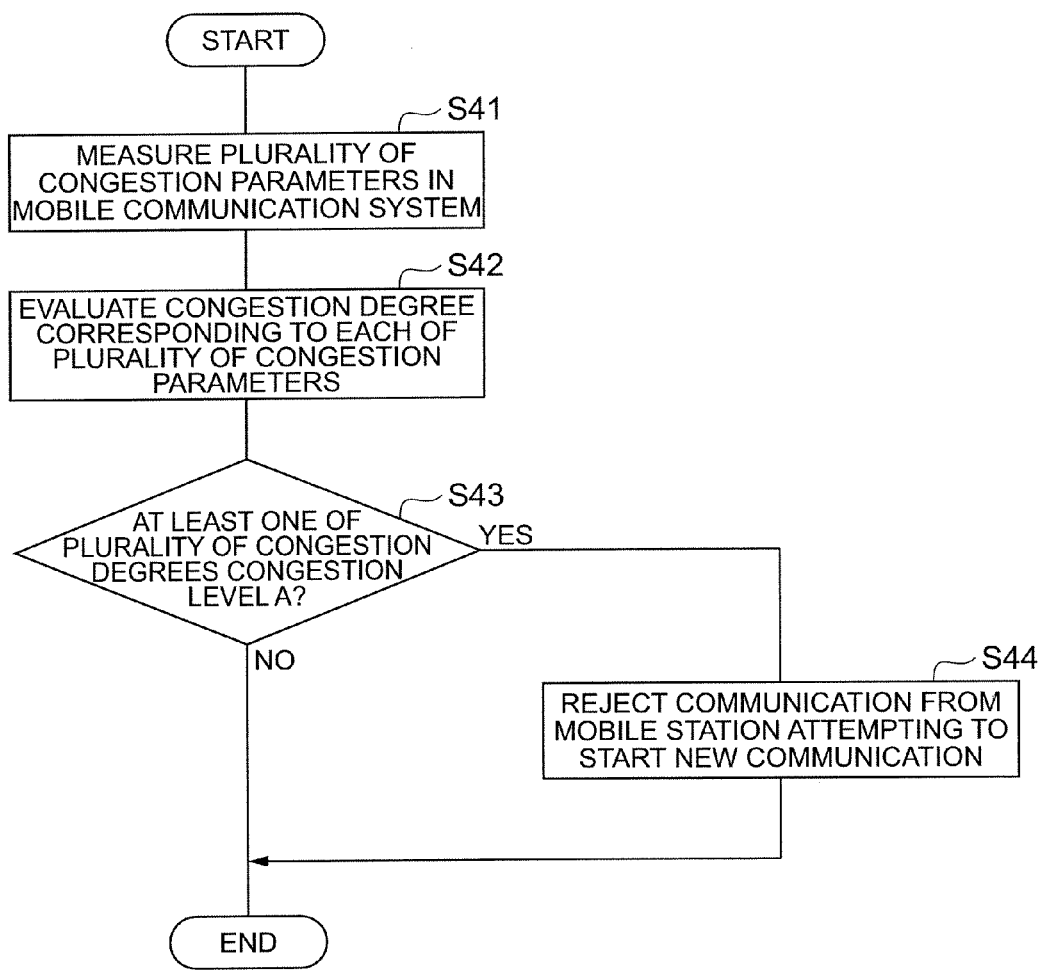
FIG. 17 is a flowchart describing another example of a process for controlling the communication settings between the radio base station and the mobile station in accordance with the congestion degree.

More specifically, the same processing as that of Step S44 described in FIG. 17 is carried out as Step S55. In this Step S55, the call admission controlling portion 404 ends processing without generating a control instruction for starting a new communication between the radio base station 30 and the mobile station 20. That is, the call admission controlling portion 404 denies the communication from the mobile station 20, which is attempting to start a new communication. In this case, the call admission controlling portion 404 determines not to receive a new communication from the mobile station 20, and the communication, which the mobile station 20 attempted to start, results in a lost call.

In addition, since Steps S51, S53 and S54 respectively correspond to Steps S11, S13 and S14 shown in FIG. 14, and Step S52 corresponds to Step S42 described in FIG. 17, duplicate explanations will be omitted. Furthermore, in this example, the processing corresponding to Steps S16 and S17 in the example described in FIG. 14 will be omitted.

Furthermore, the fact that the above-mentioned processing may be carried out by taking into account, as the priority, any of the examples mentioned above, such as priority class, service type, contract type, terminal type and terminal identifier, is the same as the example given in FIG. 14.

The operation and effects of the above-explained communication control method related to this embodiment will be explained.

According to the communication control method related to this embodiment, congestion degrees (congestion levels) for each of a plurality of congestion parameters related to congestion-generating factors are evaluated, and the communication settings between the radio base station 30 and the mobile stations 10, 11, 12, 20 are controlled. Therefore, congestion in the mobile communication system 1 is accurately estimated by taking into account a plurality of congestion-generating factors, making it possible to precisely avoid the generation of congestion. More specifically, appropriate mobile communications services can be provided by changing the communication settings to restrict communications between the radio base station 30 and at least one of the plurality of mobile stations 10, 11, 12, 20, and carrying out control, which restricts the receiving of a new communication.

Further, when the radio control station 40, subsequent to storing the congestion level, which depicts the congestion degree corresponding to any of the plurality of congestion parameters, changes the congestion level, the first threshold for raising this congestion level may be made higher than the second threshold for lowering this congestion level. By so doing, the frequency with which the congestion degree is changed in response to the fluctuation of the congestion parameters in a short period of time is reduced. Therefore, since the frequency with which the communication settings between the mobile stations 10, 11, 12, 20 and the radio base station 30 are controlled by control instructions from the radio control station 40 can be held in check, it is possible to reduce excessive loads placed on the respective components of the mobile communication system 1.

Further, a congestion degree is divided into no less than three congestion levels, and may be set at a first congestion level, a second congestion level, which depicts a lower congestion degree than the first congestion level, and a third congestion level, which depicts a congestion degree that is lower than the second congestion level. Constituting the congestion degree like this enables flexible and fine-tuned control.

In addition, at least one of the plurality of congestion parameters may be a parameter related to the downlink between the radio base station 30 and the plurality of mobile stations 10, 11, 12, 20. Further, at least one of the plurality of congestion parameters may be either code usage, baseband resource usage, or transmission power. Making these parameters congestion parameters enables fine-tuned control.

Further, a control instruction for determining the priorities set for the plurality of mobile stations 10, 11, 12, 20 by the radio control station 40, and for controlling the communication settings between the radio base station 30 and at least one of the plurality of mobile stations 10, 11, 12, 20 may be an instruction, which controls the communication settings in accordance with the congestion degree and the priority. By using a communication control method like this, the communication settings between the radio base station 30 and the mobile stations 10, 11, 12, 20 are controlled based not only on the plurality of congestion parameters, but also on the priorities set for the mobile stations 10, 11, 12, 20. Therefore, in a state of communication congestion in which it is likely that congestion will be generated, it is possible to carry out precise communication control, which conforms to the users of the mobile stations 10, 11, 12, 20, while avoiding the generation of congestion. More specifically, making communication settings between the radio base station 30 and the mobile stations 10, 11, 12, 20 based on a priority, such as a priority class, service type, or contract type, makes it possible to manage communications quality for each priority, enabling the provision of more appropriate mobile communications services.

Further, the above-mentioned control instruction may also be an instruction related to a communication setting between the radio base station 30 and the mobile station, of the plurality of mobile stations 10, 11, 12, 20, which has a low priority, and which has been communicating for a long time. Using a control instruction like this, for example, makes it possible to restrict use of a mobile station, which has been in use for a long time, and to more precisely carry out communication control, which conforms to the user of the mobile station.

In addition, a communication setting, which is controlled by the above-mentioned control instruction, may be a setting related to changing the transmission rate. Further, a communication setting controlled by the above-mentioned control instruction may also be a setting related to changing a communication channel. Using communication settings like this makes it possible to carry out more precise communication control in accordance with a congestion degree.

Also, a communication setting, which is controlled by the above-mentioned control instruction, may be a setting, which denies a communication from the mobile station 20, which is attempting to start a new communication. Using a communication setting like this makes it possible to protect the quality of communications between the radio base station 30 and the mobile stations 10, 11, 12, which are already communicating inside cell 50, by virtue of the radio base station 30 rejecting a communication generated inside cell 50 in a state of congestion in which a congestion degree is a prescribed level or more.

The radio base station 30 and radio control station 40 related to this embodiment also have technical characteristic features, which correspond to the above-mentioned communication control method, and exhibit the same operations and effects.

More specifically, the radio base station 30 related to this embodiment acquires a plurality of congestion parameters, which comprise data related to baseband resource usage as one of the plurality of congestion parameters. Therefore, since the radio base station 30 is able to receive from the radio control station 40 a control instruction, which takes into account baseband resource usage and so forth as a congestion-generating factor, the communication settings between the radio base station 30 and the mobile stations 10, 11, 12, 20 can be more precisely controlled.

Further, according to the radio control station 40 related to this embodiment, the congestion degree for each of a plurality of congestion parameters related to congestion-generating factors is evaluated, and a control instruction, which controls the communication settings between the radio base station 30 and the mobile stations 10, 11, 12 20 is generated. Therefore, since the congestion in the mobile communication system 1 is accurately estimated by taking into account a plurality of congestion-generating factors, the radio control station 40 is able to transmit a control instruction for precisely avoiding the generation of congestion to either the radio base station 30 or the mobile stations 10, 11, 12, 20.

Furthermore, the present invention is not limited to the embodiment described hereinabove, and, naturally, various changes within a scope that does not depart from the gist of the present invention are possible.

For example, in the communications control method related to this embodiment, which was explained using FIGS. 13 through 18, control was carried out based on downlink baseband resource usage, but this control may be carried out based on uplink baseband resource usage instead. Also, control may be carried out based on both downlink baseband resource usages and uplink baseband resource usage. In general, if the transmission rate of the downlink and uplink are the same, the uplink baseband resource usage and downlink baseband resource usage will be the same, and therefore control may be carried out based on the downlink baseband resource usage. Further, even if the transmission rates of the downlink and uplink differ, in an ordinary W-CDMA mode system, for example, insufficient downlink resources is more likely to lead to congestion-generating factors than insufficient uplink resources. That is, in an ordinary W-CDMA mode system, since downlink congestion degrees are more important than uplink congestion degrees, carrying out control based on congestion parameters related to the downlink makes it possible to fully avoid the generation of congestion. However, since there are also times when insufficient uplink resources will constitute a congestion-generating factor, it is desirable that control be carried out based on both uplink and downlink baseband resource usage.

Further, the sharing of functions by the radio base station 30 and radio control station 40 as described above is not limited to the above-mentioned embodiment. That is, a part of the above-described functions of the radio base station 30 may be realized in the radio control station 40, and a part of the above-described functions of the radio control station 40 may be realized in the radio base station 30. For example, the resource monitoring portion 313 of the radio base station 30 may maintain the above-mentioned tables shown in FIGS. 10 through 12, a congestion level based on the baseband resource usage in the downlink and uplink, and a congestion level based on the downlink transmission power may be decided in the radio base station 30, and these congestion levels may be reported to the congestion level evaluating portion 402 of the radio control station 40. Further, the code resource managing portion 401 may maintain the above-mentioned table shown in FIG. 9, may decide a congestion level based on the downlink code usage, and may report this congestion level to the congestion level evaluating portion 402. When functions are shared as in these examples, the congestion level evaluating portion 402 of the radio control station 40 notifies the call processing portion 403 and call admission controlling portion 404 of a congestion level reported from either the radio base station 30 or code resource managing portion 401.

Further, in the examples given above, control of communication settings for changing and retaining communication settings, and for rejecting a communication from a mobile station, which is attempting to start a new communication, is carried out based on the same congestion level, but a different congestion level may be used for each process. For example, for changing a communication setting, processing may be performed based on congestion degrees determined on the basis of baseband resource usage in the downlink and uplink, and downlink transmission power reported from the radio base station 30, and for processing other than a communication setting change, processing may be performed based on congestion degrees determined on the basis of baseband resource usage in the downlink and uplink, downlink transmission power, and downlink code usage.

Also, in the above-described embodiment, a situation in which a W-CDMA mode is employed in a 3GPP is explained, but the embodiment of the present invention is not limited to the W-CDMA mode, and may be applied to other mobile communication systems.

What is claimed is:

1. A communication control method for a mobile communication system, which comprises a plurality of mobile stations, a radio base station capable of communicating with the plurality of mobile stations, and a radio control station, which is able to communicate with the radio base station and which controls communications between the radio base station and the plurality of mobile stations, the communication control method comprising:

a measurement step of measuring a plurality of congestion parameters related to factors generating congestion in the mobile communication system;

an evaluation step of evaluating, by the radio control station, congestion degrees corresponding to each of the plurality of congestion parameters measured in the measurement step, each congestion parameters set to one of at least three congestion degrees; and a control step of performing a prescribed operation with respect to a communication setting between the radio base station and at least one of the plurality of mobile stations in accordance with a control instruction transmitted from the radio control station to the radio base station when at least one of the plurality of congestion degrees acquired by the evaluation step is a prescribed level or more, and not performing the prescribed operation with respect to the communication setting when all of the plurality of congestion degrees are less than the prescribed level.

2. The communication control method according to claim 1, wherein, when the radio control station changes a congestion level depicting the congestion degree corresponding to any of the plurality of congestion parameters after storing the congestion level in the evaluation step, a first threshold for raising the congestion level is higher than a second threshold for lowering the congestion level.

3. The communication control method according to claim 1, wherein the congestion degree is divided into no less than three congestion levels, and a higher congestion degree is set in a higher congestion level than in a lower congestion level.

4. The communication control method according to claim 1, wherein at least one of the plurality of congestion parameters is a parameter related to downlinks between the radio base station and the plurality of mobile stations.

5. The communication control method according to claim 1, wherein at least one of the plurality of congestion parameters is either code usage, baseband resource usage or transmission power.

6. The communication control method according to claim 1, further comprising a priority determination step of determining a priority, which has been set for the plurality of mobile stations by the radio control station, wherein the control instruction in the control step is an instruction for performing the prescribed operation with respect to the communication setting in accordance with the congestion degree and the priority.

7. The communication control method according to claim 6, wherein the control instruction in the control step is an instruction related to the communication setting between the radio base station and the mobile station which has the low priority and which has been communicating for a long time.

8. The communication control method according to claim 1, wherein the communication setting operated by the control instruction in the control step is a setting related to changes in a transmission rate.

9. The communication control method according to claim 1, wherein the communication setting operated by the control instruction in the control step is a setting related to changes in a communication channel.

10. The communication control method according to claim 1, wherein the communication setting operated by the control instruction in the control step is a setting for rejecting a communication from a mobile station, which is attempting to start a new communication.

11. A radio control station in a mobile communication system, which comprises a plurality of mobile stations, a radio base station capable of communicating with the plurality of mobile stations, and the radio control station, which is able to communicate with the radio base station, and which controls communications between the radio base station and the plurality of mobile stations, the radio control station comprising:

a reception portion for receiving a plurality of congestion parameters related to factors generating congestion in the mobile communication system;

an evaluation portion, including a processor, for evaluating congestion degrees corresponding to each of the plurality of congestion parameters acquired by the reception portion, each congestion parameters set to one of at least three congestion degrees;

an instruction generating portion for generating a control instruction for performing a prescribed operation with respect to a communication setting between the radio base station and at least one of the plurality of mobile stations, when at least one of the plurality of congestion degrees acquired by the evaluation portion is a prescribed level or more, and not performing the prescribed operation with respect to the communication setting when all of the plurality of congestion degrees are less than the prescribed level; and a transmission portion for transmitting the control instruction generated by the instruction generating portion to either the radio base station or at least one of the plurality of mobile stations.

12. The communication control method according to claim 2, wherein the radio control station changes the congestion level based on a prescribed hysteresis.

13. The radio control station according to claim 11, wherein the radio control station is configured to change a congestion level depicting the congestion degree corresponding to any of the plurality of congestion parameters after storing the congestion level by the evaluation portion based on a prescribed hysteresis, and wherein a first threshold for raising the congestion level is higher than a second threshold for lowering the congestion level.

* * * * *